United States Patent
Tack et al.

(10) Patent No.: US 12,539,705 B2
(45) Date of Patent: Feb. 3, 2026

(54) TEXTURED FABRIC PRINTING SYSTEM AND METHOD

(71) Applicant: Global Textile Alliance Belgium, Wielsbeke (BE)

(72) Inventors: Remy Tack, Wielsbeke (BE); Christopher D. Engels, Heverlee (BE); Michaël De Smet, Heverlee (BE)

(73) Assignee: Global Textile Alliance Belgium, Wielsbeke (BE)

( * ) Notice: Subject to any disclaimer, the term of this patent is extended or adjusted under 35 U.S.C. 154(b) by 351 days.

(21) Appl. No.: 18/179,150

(22) Filed: Mar. 6, 2023

(65) Prior Publication Data

US 2024/0300249 A1    Sep. 12, 2024

(51) Int. Cl.
  *B41J 3/407*     (2006.01)
  *D06P 5/30*      (2006.01)
  *G06T 7/00*      (2017.01)

(52) U.S. Cl.
  CPC ........... *B41J 3/4078* (2013.01); *D06P 5/30* (2013.01); *G06T 7/0006* (2013.01); *G06T 7/001* (2013.01);
  (Continued)

(58) Field of Classification Search
  CPC ........ B41J 3/4078; D06P 5/30; G06T 7/0006; G06T 7/001; G06T 2207/30124; G06T 2207/30144; G06T 2207/30204
  See application file for complete search history.

(56) References Cited

U.S. PATENT DOCUMENTS

| 4,144,647 A | 3/1979 | Mosky et al. |
| 4,146,061 A | 3/1979 | Gotoh |

(Continued)

FOREIGN PATENT DOCUMENTS

| BE | 844560 A | 11/1976 |
| BE | 900823 A | 2/1985 |

(Continued)

OTHER PUBLICATIONS

Ren, Jinxiong, Gang Chen, and Xiaoyan Li. "A Fine Grained Digital Textile Printing System Based on Image Registration." Computers in industry 92-93 (2017): 152-160. Web. (Year: 2017) (Year: 2017) (Year: 2017).*

(Continued)

*Primary Examiner* — Douglas X Rodriguez
*Assistant Examiner* — Natasha Dephenia Quinn
(74) *Attorney, Agent, or Firm* — Farber LLC

(57) ABSTRACT

A print apparatus and print method is provided for patterned fabrics, particularly those with surface variations due to threadings. These threadings may be e.g. stitches and/or bindings arranged in the fabric that create the surface variations which create the pattern. The apparatus/method involves a vision system which detects the threadings at a granular level (e.g. detects individual stitches) and then determines how those stitches have moved due to fabric stretching. The computer and its software adjust the print design (often a color design) to match the distortion/warping of the fabric. In some cases, the printer can print along a line of the stitches at a width not much wider than the stitches at high precision and with precise alignment. The fabric printed may have reference markers to aid in identification of the threadings and a calibration process may be used for the printer to align the print and vision systems.

21 Claims, 13 Drawing Sheets

(52) U.S. Cl.
CPC .............. *G06T 2207/30124* (2013.01); *G06T 2207/30144* (2013.01); *G06T 2207/30204* (2013.01)

(56) References Cited

U.S. PATENT DOCUMENTS

| | | | |
|---|---|---|---|
| 4,188,430 | A | 2/1980 | Debernard, Jr. et al. |
| 4,305,184 | A | 12/1981 | Woythal |
| 4,780,102 | A | 10/1988 | Harper, Jr. |
| 6,068,362 | A | 5/2000 | Dunand et al. |
| 6,105,624 | A | 8/2000 | Wildeman et al. |
| 6,375,293 | B1 | 4/2002 | Endo |
| 6,494,362 | B1 | 12/2002 | Harmon |
| 6,792,865 | B2 | 9/2004 | Brunet-Manquat |
| 6,796,254 | B2 | 9/2004 | Bondanza et al. |
| 6,939,583 | B2 | 9/2005 | Katsuki et al. |
| 6,988,797 | B2 | 1/2006 | Samil et al. |
| 7,409,769 | B2 | 8/2008 | Tedesco et al. |
| 8,182,550 | B1 | 5/2012 | Hayes |
| 8,708,437 | B2 | 4/2014 | Kushner et al. |
| 9,643,400 | B2 | 5/2017 | Landa et al. |
| 10,189,277 | B2 | 1/2019 | Sehiestl |
| 10,967,633 | B2 | 4/2021 | Yokota |
| 10,994,375 | B2 | 5/2021 | Weedlun |
| 2006/0213417 | A1 | 9/2006 | Codos et al. |
| 2007/0006400 | A1 | 1/2007 | Brown et al. |
| 2010/0073408 | A1 | 3/2010 | Hale et al. |
| 2021/0070041 | A1 | 3/2021 | Maruta et al. |
| 2021/0162775 | A1* | 6/2021 | Kayahara ............... B41F 17/38 |

FOREIGN PATENT DOCUMENTS

| | | | |
|---|---|---|---|
| BE | 904560 | A | 7/1986 |
| CA | 1091105 | A | 12/1980 |
| CA | 2397105 | A1 | 7/2001 |
| CN | 102673177 | A | 9/2012 |
| CN | 103015226 | A | 4/2013 |
| CN | 104129174 | A | 11/2014 |
| CN | 103434290 | B | 9/2015 |
| CN | 107901622 | A | 4/2018 |
| CN | 114905864 | A | 8/2022 |
| DE | 3422285 | C1 | 1/1985 |
| DE | 19930867 | A1 | 1/2000 |
| EP | 0613975 | A2 | 2/1994 |
| EP | 1148171 | A1 | 10/2001 |
| EP | 0401472 | A1 | 12/2012 |
| EP | 3263763 | A1 | 1/2018 |
| EP | 3653391 | A1 * | 5/2020 ............ B41J 29/393 |
| EP | 3674083 | A1 | 7/2020 |
| GB | 524273 | A | 8/1940 |
| GB | 1017155 | A | 1/1966 |
| GB | 1045268 | A | 10/1966 |
| GB | 1105734 | A | 3/1968 |
| GB | 2153617 | A | 8/1985 |
| JP | 2008248437 | A | 10/2008 |
| JP | 2022186031 | A | 12/2022 |
| KR | 20220033144 | A | 3/2022 |
| WO | 9957356 | A1 | 11/1999 |
| WO | 0178992 | A1 | 10/2001 |
| WO | 03019327 | A2 | 3/2003 |
| WO | 2005028731 | A1 | 3/2005 |
| WO | 2005074552 | A2 | 8/2005 |
| WO | 2006094312 | A2 | 9/2006 |
| WO | 2006100272 | A1 | 9/2006 |
| WO | 2014120596 | A2 | 8/2014 |
| WO | 2018061746 | A1 | 4/2018 |

OTHER PUBLICATIONS

Zhoa, Zuyun, "Line scan camera calibration fo fabric imaging", The University of Texas at Austin, Thesis for Degree of Master of Science in Textile and Apparel Technology, May 2012.
International Search Report and Written Opinion; International Application No. PCT/EP2022/055246; Jun. 6, 2024.
Ren Jinxiong et al: "A Fine Grained Digital Textile Printing System Based on Image Registration", Computers in Industry, Elsevier, Amsterdam, NL, vol. 92, Aug. 23, 2017 (Aug. 23, 2017), pp. 152-160, XP085294079,ISSN: 0166-3615, DOI: 10.1016/J.COMPIND. 2017.08.003, the whole document.

* cited by examiner

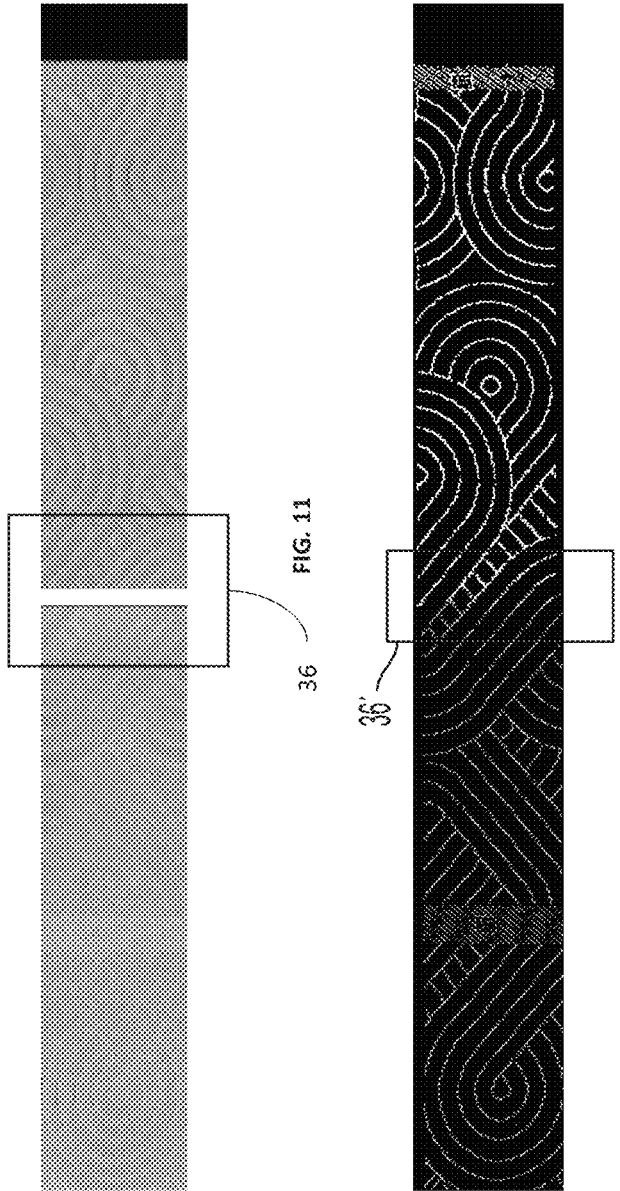
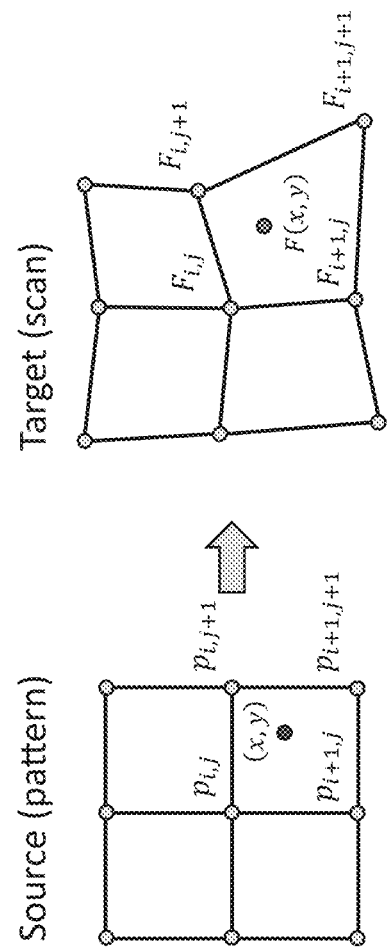
FIG. 11
FIG. 12
FIG. 13

TEXTURED FABRIC PRINTING SYSTEM AND METHOD

FIELD OF THE INVENTION

The following relates to fabrics for printing and systems and methods for printing fabrics, particularly fabrics that have patterns therein created by threadings such as stitches and bindings and variation thereof to create a surface variation that causes the fabric to have a pattern. A printed design is printed over this fabric pattern.

BACKGROUND OF THE INVENTION

Patterned fabrics are used in a wide variety of applications and are useful, for example, to provide visual and tactile appeal to the end user. Patterned fabrics are also useful for branding/marketing purposes as a logo or other design can be woven/sewn/quilted into the fabric itself. These patterned fabrics will have surface variations which create these patterns. In the example of a double jersey knit fabric, stitches are put into the fabric according to a pattern design which compresses the fabric at the stitches to create undulations or surface variations. At areas without these stitches, there is generally a higher loft to the fabric than at the stitches. This creates surface variations that provide the pattern. Generally, these stitches which compress (foreground stitches) go across the base weaving pattern of the two faces of the fabric. These stitches are added during the weaving process as the fabric is being woven/manufactured. Other examples are quilted fabrics. These generally are made from two existing fabrics with a filler placed between and then a large sewing machine moves needles through the layers to compress the fabric. Yet another example would be a woven fabric where the type of binding and its pattern can be changed across and along the fabric in order to create different textures and a resulting pattern due to how the bindings change and are located/oriented in order to create these surface variations.

However, there are limits on color of the fabrics with patterns as well as the ability to vary the color and design. For example, the double jersey knit fabric would require yarns to be of different colors to weave in a color pattern that varies and those yarns would be of a single color along their length. In contrast, printing allows for infinitely variable color selection. In an example of a quilted fabric, if this were printed before the pattern creating stiches added, this print would not allow much design flexibility as once the fabric is printed, the quilting is added and the fabric design cannot change for different customer needs. Thus, only a single graphic design in terms of printed colors can apply if the fabric is printed first and then quilted. In this way, customization is limited.

The woven fabrics example is also challenging as the variation in binding would not only require the binding to change, but the color of the thread would have to change in order to put a color design into the fabric. Again, once this is woven in, the color design cannot be easily changed and customization is limited. Also, even if a color of fabric were added in the weaving process, this is generally in the single digit of number of colors that can be added whereas printing provides infinitely variable colors and quite a lot more design flexibility.

Therefore, there is a need to provide a fabric and a printing apparatus and printing method that solves these issues and allows for customization of print designs on patterned fabrics while providing high print quality and alignment.

SUMMARY OF THE INVENTION

The present system and fabrics printed thereby use threadings and specifically variations in the fabric created thereby to allow cameras to identify a pattern at a thread level to print on and identify how that fabric may have stretched or distorted. Two specific examples of a threading which would create patterns in a fabric include stitches and bindings. Pattern stitches are commonly used in quilted, jacquard or double jersey knit style fabrics to create surface variations in the fabric which creates a pattern in the fabric. These fabrics also have base stitches which usually make up the majority of the fabric design adjacent/between the pattern stitches. These fabrics are sometimes relatively plush and padded in certain locations and the design of the pattern stitches compresses the fabric to create high and low spots-more loft where no pattern stitches are present, lower loft at pattern stitches.

The threading (stitch in this example) will be used by the scanner/imaging system to identify the various stitches and then compare them to an expected design location of stitches to determine a distortion/stretch of the fabric. The system can identify pattern stitches and can also identify the base stitches instead in that identifying those base stitches would also indicate the presence of the pattern stitches in other locations. The system can also identify both pattern and base stitches to determine the distortion of the fabric. Thus, the identification of stitches (e.g. whether pattern of base) is used by the present system to print the color design/pattern in correct alignment with the fabric pattern.

Another example of a threading as used herein is a binding. The term binding is used typically to designate a woven pattern in a fabric. By changing the binding and where that change happens, variations in the fabric can be created and a design can be woven into the fabric itself. Examples of bindings include a plain weave, twill weave, atlas weave, crepe weave, but there are many variations and examples known to those of skill in the art. Many woven fabrics are created by a number of warp threads and a number of weft threads which go over or under the warp threads. The pattern with which the weft threads go over or under or how many warp threads they skip and where determines the texture of the fabric. The type of thread can also change the texture. Depending on how the texture of the fabric changes based on what binding is used where and what pattern is used, these changes can be detected at the binding level by the camera, for example, identifying that the weft thread goes over two warp threads, then under one and again over two warp threads in a particular location. The combination of these patterns as detected by the camera allows for a comparison to the design of the weave and its associated bindings so that distortion (e.g. stretch) can be determined so that the design can be printed correctly. As but one example, the logo or trademark of a company may be woven into a fabric that has some stretch. It may be desirable to then print that logo in one or more colors and sections adjacent to the logo in a different color. Obtaining proper alignment and distortion of the print design relative to the actual state of the fabric is important for giving a high quality and a properly aligned print. Since the bindings are what creates the logo as woven into the fabric, identifying these bindings or threading is important. Accordingly, by identifying the fabric and its pattern at the thread level precision of the print design and its alignment is increased substantially. Thus, identifying the threading (e.g. binding or stitches), allows for the print design to be aligned with a great deal of precision. Without such precision, the printed design could be skewed relative to the fabric pattern, creating a low quality look which would not have the same appeal or pricing advantages. The system identifies these threadings and then modifies a print design (often in color) to match how the fabric has distorted/warped.

It is an object of the present invention to provide a printing apparatus, software and printing method that allows for printing on patterned fabrics, particularly aligning the print design with the pattern on the fabric.

It is further an object of the present invention to provide a patterned fabric which assists the printing apparatus and software to align the fabric.

It is further an object of the present invention to print patterned fabric with a design while adjusting for stretching and/or other distortions in the fabric.

It is yet a further object of the invention to provide a fabric with a pattern therein which has reference markings to assist with alignment/adjustment of the printer.

It is yet a further object of the invention to provide an imaging, transport and printing system for scanning, moving and printing patterned fabrics.

It is yet another object of the invention to identify threading within fabrics that are indicative of patterns in a fabric and use those threadings to align and modify printed designs to ensure proper matching between fabric patterns and printed color patterns on fabrics.

These and other objects are achieved by providing a method of printing a patterned fabric comprising one or more steps of: imaging a section of patterned fabric with at least one imaging device to generate actual thread data indicative of a plurality of threadings which are either a plurality of stiches in the fabric which stitches create low points in the fabric to create surface variations or are woven bindings which create the surface variations wherein the surface variations cause the fabric to have a pattern; comparing the actual thread data to design thread data indicative of expected locations of each the plurality of stitches or woven bindings, the comparing determining a print adjustment which accounts for distortion of the actual thread data relative to the design thread data; adjusting print data indicative of a printed design to be printed on the pattern relative to design thread data for the section of the fabric, the adjusting utilizing the print adjustment to determine actual print data which adjusts the printed design to match the actual thread data; printing the fabric using the actual print data; and moving the fabric to a next section of the fabric and repeating the imaging, comparing, adjusting and printing steps for the next section and each subsequent next section until the fabric is printed.

In certain aspects the imaging step further comprises imaging an area of the fabric which is expected to include location markings, the location markings indicative of a position on the fabric relative to the three dimensional pattern. In still other aspects when an expected location marking is detected, the comparing step's comparison of actual stitch data and design stitch data further uses the marking to calibrate to a location within the design stitch data which is imaged. In yet other aspects, the location markings are a plurality of stitches. In still other aspects wherein the location markings are a plurality of stitches in a selvedge of the fabric.

In certain aspects, the at least one imaging device is at an imaging location and a movement device moves the section from the imaging location to a print location associated with the print unit for printing. Lighting is provided at the at least one imaging device to assist in the detection of threadings. In other aspects more than one section of fabric is imaged prior to the section of fabric being printed. In still other aspects the movement device comprises a belt and an encoder measures movement of the fabric between the imaging location and the print location.

In other aspects the comparing, adjusting and moving steps are implemented with software executing on a computer. In certain aspects the threadings are stitches and when printing the fabric with the actual print data one or more of the stitches are printed in a first color that is different from a second color printed on an area adjacent the stitches, with the area adjacent the stitches having a higher loft than at the stitches.

Yet other objects are achieved by providing a printing apparatus. The apparatus includes a feed unit configured to move a patterned fabric in a feed direction. An imaging unit is configured to image the fabric to detect a plurality of threadings in the fabric to generate actual threading data, the threadings create surface variations in the fabric which cause the fabric to include a pattern. A processor is configured to compare the actual threading data to design threading data indicative of expected locations of each the plurality of threadings, the comparing determining a print adjustment which accounts for distortion of the actual threading data relative to the design threading data, the processor further configured to adjust print data indicative of a printed design to be printed on the three dimensional pattern relative to the design threading data, the adjusting utilizing the print adjustment to determine actual print data which adjusts the printed design to match the actual threading data. A print unit is arranged downstream of the imaging unit along the feed direction and the print unit configured to print the fabric using the actual print data.

In certain aspects the imaging unit is configured to image a plurality of markers in the fabric, wherein the processor references at least one of the plurality of markers relative to the design stitch data to determine a location in the design stich data which is being imaged. In other aspects wherein the feed unit moves a next section of the fabric to the print unit for printing and wherein the actual print data of the next section is adjusted to align with the actual print data of a previous section of the fabric. In still other aspects an encoder measures movement of the fabric by the feed unit and provides a signal to the processor. In still other aspects the fabric is imaged while the feed unit is moving the fabric past the imaging unit and the signal from the encoder is used to determine a lengthwise position for the actual threading data which is thereby used to align the fabric with the print unit.

In other aspects the feed unit comprises an endless belt with a tacky or high friction surface which inhibits sliding and/or stretching of the fabric between the imaging unit and the print unit. In still other aspects the plurality of threadings are a plurality of stitches in the fabric. In yet other aspects the plurality of threading are a plurality of woven bindings in the fabric.

Other objects are achieved by providing a fabric printer which utilizes a dynamic print buffer. The printer includes an imaging unit configured to image the fabric to detect a plurality of threadings in a plurality of sections of the fabric to generate actual threading data, the threadings create surface variations which thereby cause the fabric to be patterned. A processor is configured to compare the actual threading data to design threading data for each section of the fabric, the design stitch data indicative of expected locations of each the plurality of threadings, the comparing determining a print adjustment which accounts for distortion of the actual threading data relative to the design threading data, the processor further configured to adjust print data indicative of a printed design to be printed on the pattern of the fabric relative to design threading data wherein the print data represents the printed design for a plurality of sections of the fabric, the adjusting utilizing the print adjustment to determine actual print data for each section of fabric which adjusts the printed design to match the actual threading data for each section of fabric. A print unit is arranged downstream of the imaging unit along the feed direction and the print unit including a print buffer which is configured to sequentially receive the actual print data for each section of the fabric and use that actual print data for each section of fabric to instruct a print head to print the fabric. In some cases, a semi-continuous printer is used in this case, the print head will be capable of printing a certain number of print lines with each stroke and then the fabric is moved in order to print the next stroke. The dynamic print buffer in this case would collect print lines of actual print data until there are enough lines to print a stroke. Thus, the printing process is one that starts and stops. Here, in this embodiment, the linescan cameras also operate in a line mode in that the images are scanned line by line and the intended pattern broken down into line by line segments and then distorted to match the fabric to then generate the print lines for printing in the manner further described herein. Other printers could also be used such as the type referred to as single pass or continuous printers. The semi-continuous print head has a series of nozzles to spray ink on the fabric and this print head transports them across the fabric to spray the various colors in the areas needed. A single pass or continuous printer differs in that there may be a bank of nozzles across the entire width of the printer for a single color and then each additional color has a similar bank of nozzles, but feeding a different color. In this way each color may have one location along the belt feed direction such that as the fabric moves it is first printed in the C, M, Y, K colors as needed. In this manner, the one print line is enough to print, but the speed of the belt is determined by how fast the print lines can be fed to the printer.

In the semi-continuous process, a feed unit is configured to move the fabric such that each section of fabric is imaged with the imaging unit to generate the actual print data for each section of fabric and the feed unit then sequentially aligns each section of fabric with the print unit and the actual print data is fed to the print buffer sequentially to print the corresponding section of the fabric. In the continuous process, the belt moves in a continuous manner and the buffer is sequentially fed lines of actual print data which are printed by the various color stages as the fabric moves with the belt.

In certain aspects the plurality of threading are a plurality of stitches in the fabric. In other aspects the plurality of threading are a plurality of woven bindings in the fabric.

Other objects are achieved by providing a patterned fabric with a number of threadings therein which cause surface variations in the fabric. A selvedge of the fabric includes reference markers therein, preferably also identified by threadings in the fabric (e.g. bindings or stitches). The reference markers include some matching portions that allow for computer imaging identification of the markers at the threading level and a coded portion which varies to identify where along the fabric the marker is located and thus allow a printing and imaging apparatus to identify threadings within a pattern area between the selvedges which pattern area will be printed or is printed with a printed design.

In some aspects a fabric includes a pattern and is configured with markings on the selvedge thereof to be machine read for printing on the pattern according to distortion of the read fabric as it is fed through a imaging and printing machine. The fabric includes a first exterior portion and a second exterior portion. A middle portion is between the first and second exterior portions which adds loft. Stitching is arranged in a pattern which compresses the middle portion between the first and second exterior portions in order to create a three dimensional pattern on the first exterior portion wherein the loft is greater in areas without stitching as compared to areas at or adjacent to stitching such that an exterior side of the fabric has undulations within an area of the knit fabric and the first exterior portion is substantially un-printed within the area. A selvedge is positioned adjacent to the area. The fabric is configured to be arranged on a roll such that when un-rolled the knit fabric is longer than it is wide along a longitudinal direction, the selvedge also extending along the longitudinal direction, wherein the pattern is a repeating pattern which repeats at a defined interval along the longitudinal direction. A plurality of markers are positioned on the selvedge and are configured to be read by the imaging and printing machine, the markers spaced at distances along the longitudinal direction within the defined interval such that the markers indicate a position along the longitudinal direction relative to the repeating pattern.

In certain aspects the selvedge has a width that is at least twice a width of a widest of the plurality of markers. In other aspects the width of the selvedge is less than 6 times the width of the widest of the plurality of markers. In still other aspects the plurality of markers each comprise a plurality of stitches in the selvedge. In yet other aspects the plurality of markers include a border and an interior portion with the border substantially enclosing the interior portion. In other aspects the border is the same for each of the plurality of markers and the interior portion varies for the plurality of markers. In other aspects each of the plurality of markers within the defined interval are different than others of the plurality of markers within the defined interval. In other aspects at least one of the plurality of markers within the defined interval is different than others of the plurality of markers within the defined interval. In other aspects at least one of the plurality of markers within the defined interval is different than others of the plurality of markers within the defined interval. In still other aspects spacing between two or more of the plurality of markers is between two and ten times a length of a longest of the plurality of markers. In yet other aspects the knit fabric is a double jersey jacquard fabric.

Other objects are achieved by providing a patterned fabric which includes threading arranged in the fabric to create surface variations which define a pattern within an area and the fabric is substantially printed within the area. A selvedge is positioned adjacent to the area. The fabric is longer than it is wide along a longitudinal direction, the selvedge also extending along the longitudinal direction, wherein the pattern is a repeating pattern which repeats at a defined interval along the longitudinal direction. A plurality of markers are positioned on the selvedge, the markers spaced at distances along the longitudinal direction within the defined interval such that the markers indicate a position along the longitudinal direction relative to the repeating pattern. A print within the area is arranged such that a portion of the fabric adjacent to a change in surface texture is printed in a first color and a different portion of the fabric also adjacent to the change in surface texture is printed in a second color.

In certain aspects the plurality of markers are each created by threading variations in the selvedge which are a plurality of stitches, variations in binding or combinations thereof. In other aspects at least two of the plurality of markers have different threading variations relative to each other. In still other aspects the threading is stitching arranged in a pattern which compresses a middle portion of the fabric between first and second exterior portions of the fabric in order to create a three dimensional pattern on the first exterior portion wherein loft is greater in areas without stitching as compared to areas at or adjacent to stitching such that an exterior side of the fabric has undulations within an area of the knit fabric.

Other objects are achieved by providing a fabric including a design area and a selvedge area. The design area includes a pattern defined by threading variations which threading variations are created by stitches, binding variations or combinations thereof. The fabric is longer than it is wide along a longitudinal direction, the selvedge also extending along the longitudinal direction, wherein the pattern is a repeating pattern which repeats at a defined interval along the longitudinal direction. The markers are positioned on the selvedge, the markers spaced at distances along the longitudinal direction within the defined interval such that the markers indicate a position along the longitudinal direction relative to the repeating pattern.

In other aspects wherein at least some of the plurality of markers within the defined interval are different from others of the plurality of markers within the defined interval. In still other aspects the selvedge area substantially excludes the pattern of the knit area. In other aspects the markers are defined by a plurality of stitches or binding variations in the selvedge area in a pattern and the knit area is printed at least in part including on or adjacent to the threading variations.

Other objects are achieved by providing a method of printing a three dimensional fabric. The method includes providing a fabric with: a design area and a selvedge area, the design area including a pattern defined by threading variations which threading variations are created by stitches, binding variations or combinations thereof; the fabric is longer than it is wide along a longitudinal direction, the selvedge also extending along the longitudinal direction, wherein the pattern is a repeating pattern which repeats at a defined interval along the longitudinal direction, a plurality of markers are positioned on the selvedge, the markers spaced at distances along the longitudinal direction within the defined interval such that the markers indicate a position along the longitudinal direction relative to the repeating pattern; and printing the design area with a print design such that different portions of the pattern are printed with different colors and at least some of the threading variations within the design area separate at least two different colors in the print design.

Other objects are achieved by providing a system for printer and imaging system alignment which includes a printer which is configured to print a substrate. An imaging system images the substrate and software executes on a computer and receives first image data from the imaging system of the substrate. The substrate has a first pattern thereon. A movement device is configured to move the substrate from an image position associated with the imaging system to a print position for printing. The printer prints a second pattern on the substrate such that the substrate includes the first and second patterns thereon. The movement device moves the substrate printed with the second pattern back to the image position where the imaging system obtains second image data of the substrate. The software determines from the second image data an offset of the imaging system which offset is a comparison between an expected position and an actual position to generate a calibration indicative of a difference between relative positions of the imaging system to the printer. The expected position is where the second pattern is expected to be located relative to the first pattern based on the first image data and the actual position is where the second pattern is actually located relative to the first pattern based on the second image data. The calibration is applied to the imaging system or the printer or a combination thereof so that the expected and actual position are substantially the same if a second substrate is imaged and printed by the printer.

In certain aspects a movement tracking device is in communication with the computer and configured to send signals to the computer indicative of movement of the substrate. In other aspects, signals from the movement tracking device are used at least in part to determine the expected position or actual position or both. In still other aspects, based on the first image data a print file for the second pattern is adjusted by the computer to print in a predetermined position relative to the first pattern which is the expected position.

Other objects are achieved by providing a method of calibrating a print and imaging system. The method includes one or more of the steps of obtaining first image data of a section of a substrate from an imaging position using an imaging system, the substrate having a first pattern thereon; moving the substrate to a second position and printing a second pattern on the substrate using a printer; moving the substrate with the first and second patterns thereon back to the imaging position and obtaining second image data of the substrate; determining an expected position of the second pattern relative to the first pattern based on a print file associated with the second pattern; determining an actual position of the second pattern relative to the first pattern based on the second image data; comparing the expected and actual positions to determine a calibration adjustment of the printer relative to the imaging system.

In certain aspects the imaging position is one or more positions of the substrate (e.g. a range) and the substrate is moved past the imaging system to image an area of the substrate. In other aspects the second position is one or more second positions of the substrate (e.g. a range) where the substrate is printed. In other aspects the method includes printing a second substrate by imaging said second substrate, adjusting a print file based on said imaging of said second substrate and moving said second substrate and then printing said second substrate with the adjusted print file and also applying the calibration to the printer. In other aspects the second substrate is a fabric material with a higher degree of stretch than the substrate. In still other aspects moving of the second substrate is done on a conveyor with sufficient tack and/or surface friction to inhibit the second substrate from distorting between imaging and printing of the second substrate. In yet other aspects moving of the substrate is done on a conveyor with sufficient tack and/or surface friction to inhibit the substrate from sliding or distorting. In still other aspects, in determining the expected and actual position of the second pattern and in the comparing step, the first pattern is of a known arrangement and configuration.

Other objects of the invention and its particular features and advantages will become more apparent from consideration of the following drawings and accompanying detailed description.

BRIEF DESCRIPTION OF THE DRAWINGS

FIG. 11 shows images taken by adjacent imaging devices in the vision system of FIGS. 1A-B.

FIG. 12 shows matching and combining of the stitch data of the adjacent images in FIG. 11.

FIG. 13 shows how warping is determined in the fabric by the apparatus of FIG. 1A-B.

DETAILED DESCRIPTION OF THE INVENTION

Figure 1A:
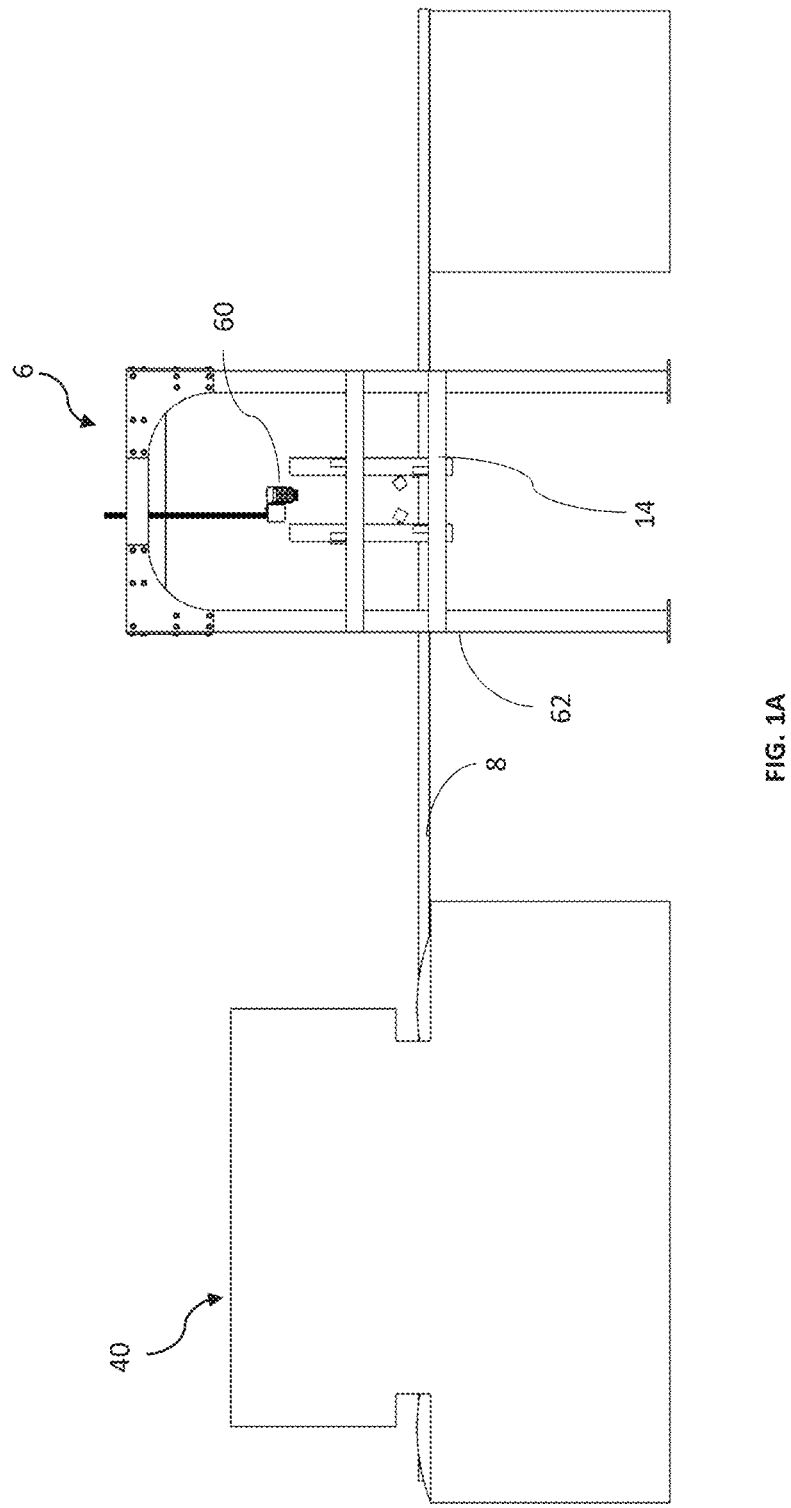
FIG. 1A is a side view of an imaging and print apparatus according to the present disclosure.

Referring now to the drawings, wherein like reference numerals designate corresponding structure throughout the views. The following examples are presented to further illustrate and explain the present invention and should not be taken as limiting in any regard.

Figure 1B:
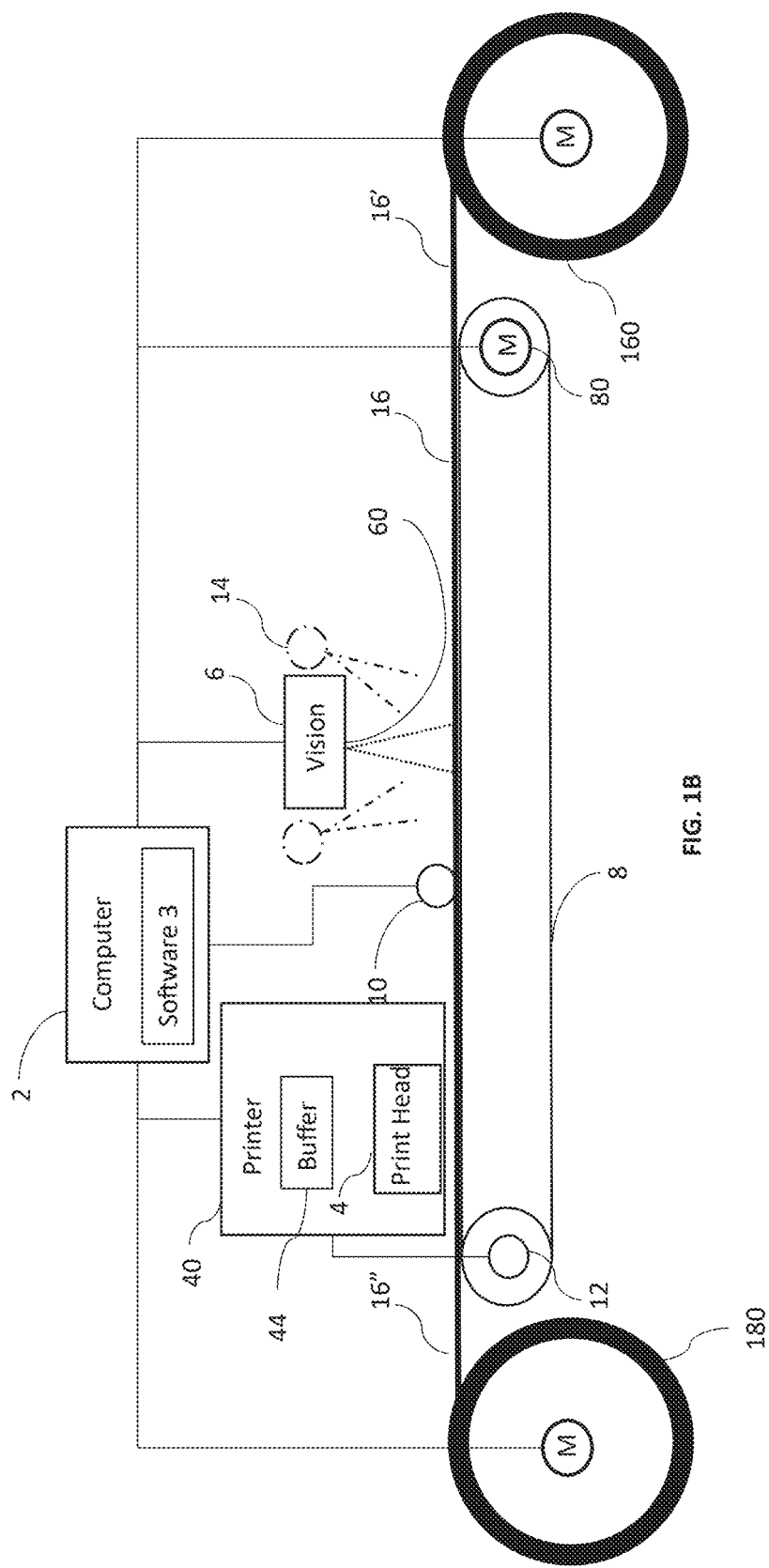
FIG. 1B is a schematic view of the apparatus of FIG. 1A
Figure 2:
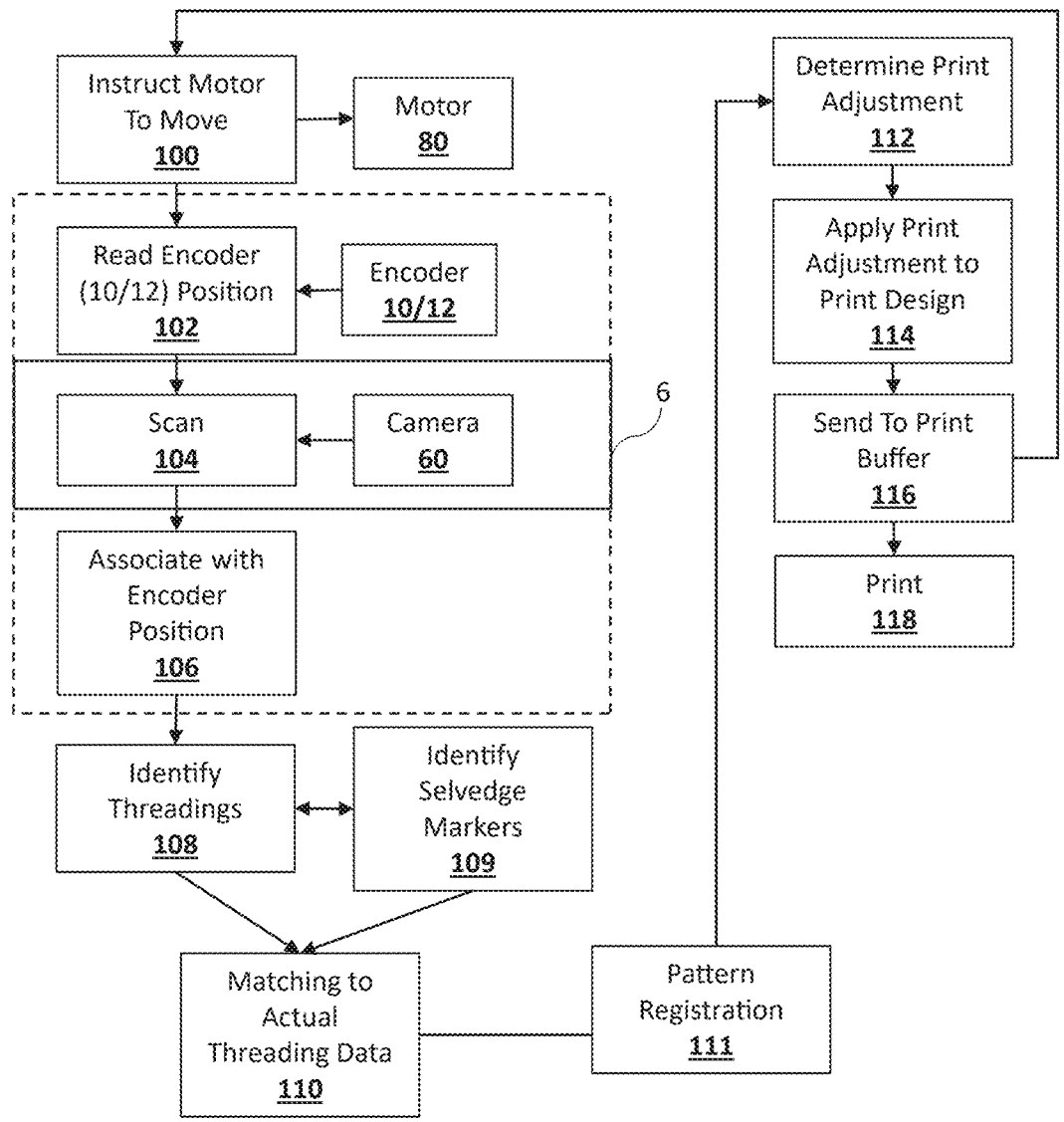
FIG. 2 is a functional flow diagram depicting operation of the apparatus of FIGS. 1A-1B FIGS. 3A-3I are top views of markers in a fabric printed by the apparatus of FIGS. 1A-1B.
Figure 3A:
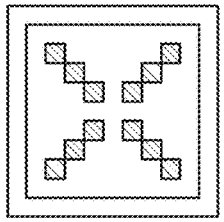
Figure 3E:
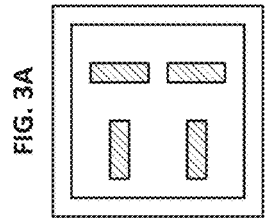
Figure 3B:
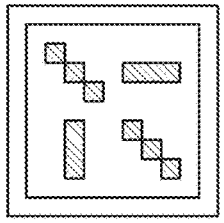
Figure 3F:
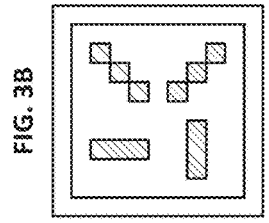
Figure 3C:
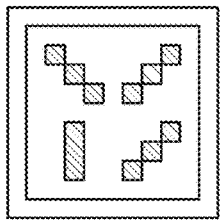
Figure 3G:
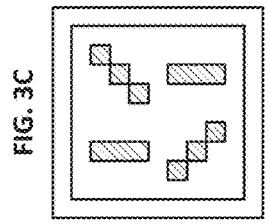
Figure 3D:
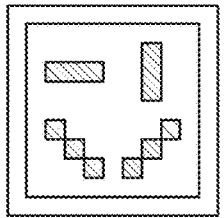
Figure 3H:
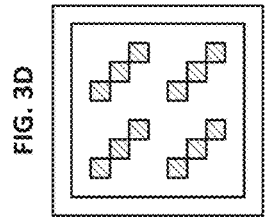
Figure 3I:
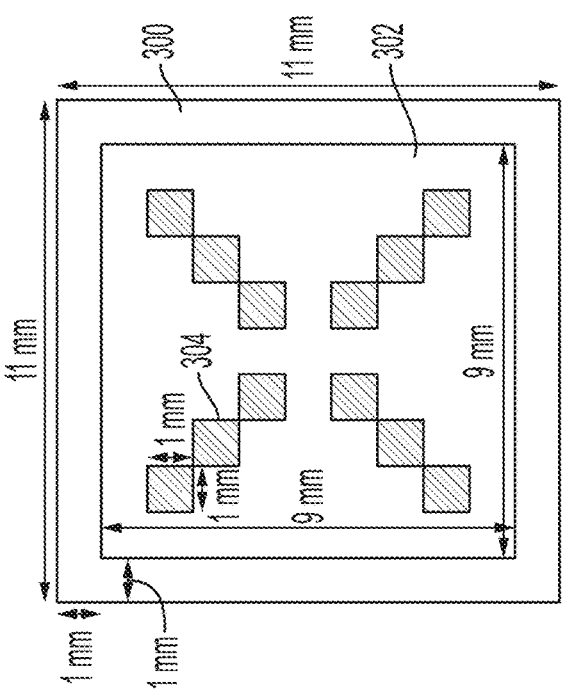

FIGS. 1A and 1B show the imaging and print machine used to scan and print patterned fabrics. FIG. 2 shows further detail on the process of scanning, adjusting and printing. Referring to these figures together, a computer 2 is connected to vision system 6, a print head 4 and encoders 10, 12. The computer has software 3 that receives the data from the vision system 6, the encoders 10/12 and controls the various connected devices shown. The computer uses this data, particularly that from the vision system 6 and the encoders 10/12 to identify threadings in the fabric being scanned and match those threadings to the design threading data. Generally, the printer controls the conveyor in that once there are enough lines to print, the fabric is moved into the correct position. However, the computer feeds these lines to the printer, thus the speed with which lines are fed to the buffer of the printer can limit/control the speed of the printer. For example, the printer may control a motor, such as a step motor, associated with the conveyor 8. The encoder 12 may be built into the motor 80, or the motor may have its own encoder which also communicates with the computer so that the computer can keep track of the position of the fabric and know where the lines being scanned are located. In some embodiments, the conveyor 8 includes a rubber or rubber like material or other tacky or relatively high friction material on the outer surface which contacts the fabric 16. The fabric 16 is fed from a roller. Due to the inherent ability of the fabric 16 to stretch and deform, the fabric which enters the printing machine can vary from its pattern design. Thus, the imaging and printing system needs to be able to identify the fabric, its pattern and compare that to a design pattern to then allow the color print design to be warped to match any distortion in the fabric.

The fabric 16 rests on the conveyor 8 and is moved 100 under the vision system 6. The computer 2 is in communication with printer 40 and its controller and buffer 44. The printer controller will drive the motor 80 which drives the belt 8. The computer 2 will progressively send instructions and print data to the buffer 44 which then allows the printer 40 to print that data. The vision system in some embodiments may be one or more line scan cameras that are designed to scan a limited linear pathway across the fabric. This type of camera can be useful as it limits the possibility of image distortion due to the angle and orientation of the camera. Line scan cameras yield perspective distortion in one direction (along the sensor line), compared to an area scan camera which provides perspective distortion in all directions. Thus, the use of line scan cameras may limit distortion and allow for better and more accurate threading detection. However, area scan cameras and other vision devices, scanning devices, cameras and camera types can also be used. As can be seen lights 14 are provided to illuminate the area which the vision system 6 captures. Various types of lighting can be used, but preferably the lighting is as uniform as possible to avoid undesirable shadow effects and/or lighting artifacts. However a complete washout may not be helpful as some shadow effects can create contrast and allow for the identification of stitches.

The encoder position 10/12 is read 102 and the vision system 6 will scan/image 104 the fabric and send the scanned image to the computer 2. The computer may associate the encoder data with the scanned image data 106 or the vision system 6 may do this. Furthermore, the conveyor has an encoder 12 which provides precise position of the conveyor rollers, thus allowing position of the fabric 16 to be inferred. However, in some embodiments another encoder 10 may be useful to directly read movement of the belt 8. It should be noted that the fabric will typically be narrower than the belt and thus the belt movement can be read by the encoder 10 adjacent, for example the encoder may comprise a wheel which contacts the belt and is rotated by movement of the belt. The print head 4 may have a defined length of fabric that it can print in one print stroke. Further, as shown the print head and the vision system are spaced apart along the longitudinal direction of the fabric. The tacky or high friction nature of the belt helps ensure that the fabric does not stretch/distort when moving between the vision 6 and printing stations 4/40. However, it is understood that stretching/distortion may have already occurred prior to the fabric 16 being placed on the belt 8.

As the fabric moves past the vision system 6, the scan data is obtained and since it is associated with the encoder position 106, the data allows the computer to determine actual threading data for the fabric. Thus, the computer will identify threadings 108 of the fabric. This process involves identifying the pattern in the fabric on the level of the threading that creates the pattern. For example, with a double jersey knit fabric, the scan data and the encoder data allows the computer to identify the actual stitches in the fabric and locate those along the length of the fabric. The position across the width of the fabric can be determined based on which imaging device picks up the threading/stitch and where that camera is located and its field of vision in reference to length would be determined by the vision system. The threadings (stitches in this case) would be the added stitches from the design stitch data, or sometimes called foreground stitches.

Figure 5:
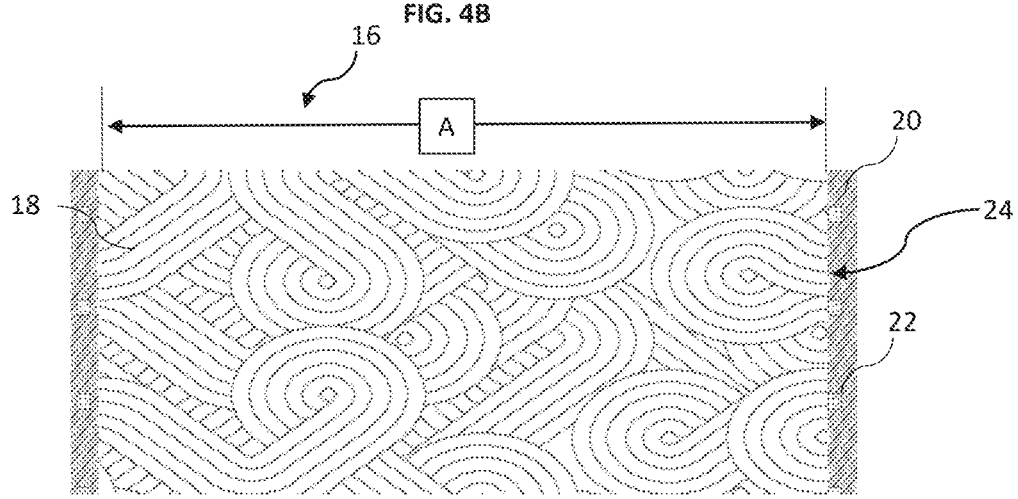
FIG. 5 shows further detail on threading design information used by the apparatus of FIGS. 1A-1B.

The design stitch data may be a bitmap image such as the one shown on FIG. 5. Here, each pixel may represent a stitch which is usually about 1 mm long, but different stitch lengths/dimensions are contemplated and this is but one example. Thus, the appearance of a black pixel in the design stitch data represents the expected location for that particular stitch. When quilting the fabric, it may be this bitmap image which is used to instruct the quilting head to put stitches in various locations. Furthermore, the computer will typically know the background knit pattern or will be able to recognize it from the scanned data as this pattern repeats in a consistent way in the background. In some embodiments, the pattern stitches (foreground stitches in this case) are the ones the computer is looking to find as the distortion of these stitches due to fabric stretching or otherwise is what controls how the designed pattern has distorted in the fabric. However, as mentioned previously, base stitches (background stitches in this case) could also be useful in identifying patterns in the fabric and distortion thereof. Thus, the computer can look for pattern stitches, base stitches or combinations thereof.

It is important to print taking account the distortion, particularly when the printed design is supposed to match the fabric pattern in one or multiple locations. The fabric tends to stretch and distort in a non-linear pattern when placed on the conveyor belt, thus it is necessary to adjust the print data to match the actual conditions of the fabric. The fabric 16 has a design area represented by width A and then along the length of the fabric. The design is created by threadings 18 (stitches in this case). Here, the design is a bitmap image where black pixels represent a stitch, in this embodiment a 1 mm stitch. However, other stitch lengths can be used and this is merely an example. The selvedges 20 are on either side (or one) and include the markers 22.

Figure 9:
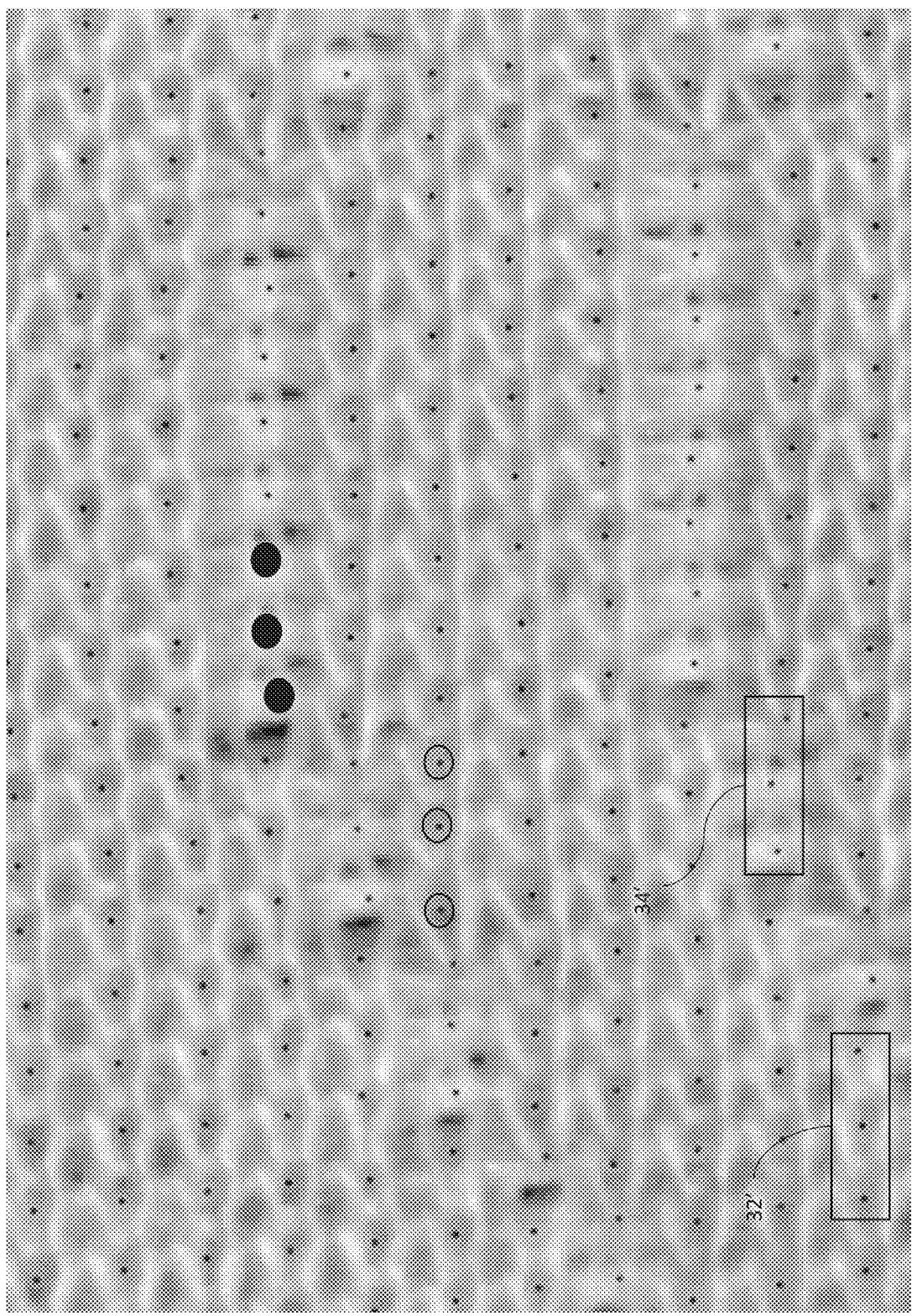
FIG. 9 shows the detection of foreground and background stitches in an actual fabric printed by the apparatus of FIG. 1A-B.

FIG. 9 shows the fabric as actually scanned with the threadings (stitches in this case) recognized by the computer. The way in which the stitches are recognized has to do with the computer resolving the scans to determine foreground (pattern) and background (base) stitches. The recognition of the threadings allows for a print adjustment to be determined for the printed pattern (typically a color pattern) that is to be printed on the fabric. There are a number of dots shown, e.g. those within area 34' and others. Those dots represent the image that has been annotated by the computer to identify stitches. The added larger solid black dots and open circles are added here to clarify the different types of stitches as in the color version of the image, the dots 34' may be different colors than other dots to designate foreground (pattern) v. background (base) stitches.

Figure 7:
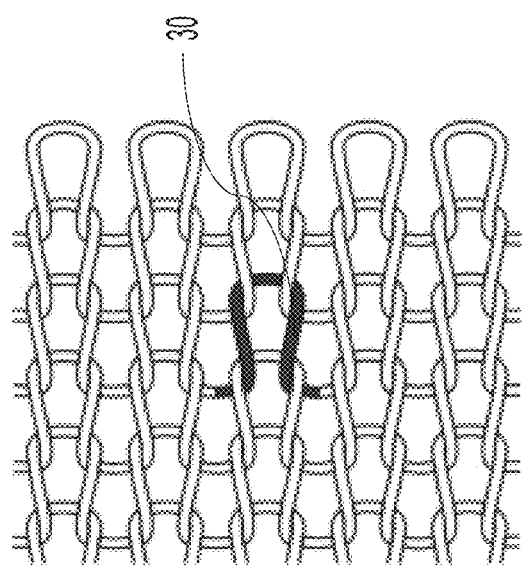
FIG. 7 shows the weaving pattern of background stitches for one example fabric printed by the apparatus of FIG. 1A-B.

The fabric itself may have a knit pattern, for example the weft knit pattern shown in FIG. 7. This pattern may be considered background stitches or the base stitches. The highlighted (darkened) stitch 30 represents one such stitch. Thus, the computer will recognize the difference between commonly repeating background or base stitches (e.g. the weft knit pattern) and the added foreground stitches associated with the design stitch data.

Figure 8:
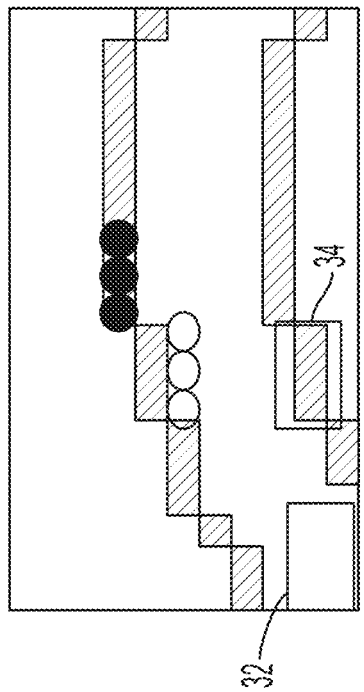
FIG. 8 shows a detail view of FIG. 5.

Referring to FIG. 8 a portion of the design stitch data of FIG. 5 has been zoomed in upon and it can be seen where two pixels wide can represent two stitches, three pixels wide of black would then represent three stitches and so forth. This design stitch data is then compared to the scan/image of the fabric which has been filtered to determine where foreground and background stitches are. As mentioned previously, these pixels are where the knitting machine has been instructed to send a threaded needle through the front and rear faces to compress the yarns in the middle to pull these faces together in the knitting process.

The actual scan of the area represented in FIG. 8 is shown in FIG. 9. Here, the open circles show the location of background stitches whereas the closed circles show foreground stitches. FIG. 8 has the corresponding open/closed circles added that correspond to the ones at FIG. 9. Not all stitches have added circles so that the rest of the scan can be seen for context, but to the immediate right of the three closed circles, there are 6 foreground stitches generally arranged in a line. The open and closed circles are added in FIG. 8 as well to show where those marked on FIG. 9 correspond to the design threading data (stitch map in this case). It should be noted that FIGS. 8 and 9 are not the same scale, so the circles do not perfectly correspond, but the general area thereof is shown for context. As can be seen in comparing the design stitch data, some stitches in e.g. a series of 3 stitches 34 are expected to go straight across. The actual image shows there is some distortion in that the stitches 34' are not necessarily in a perfectly straight line. The same can be seen in reference to the sold dot stitches representing pattern threadings (foreground stitches) in other locations. Base threadings (background stitches) 32' can also be identified and these correspond with locations in the design stitch data (FIG. 8) which are blank 32. As can be seen, the foreground stitches in FIG. 9 change the repeating pattern of the adjacent background stitches, thus allowing the computer to determine where the foreground stitches are located from the image data obtained from the vision system 6.

Thus, the comparison to the design data (FIGS. 5 and 8) to the scan (FIG. 9) allows for the mapping of the stitches overall so that it can be determined where portions of the fabric pattern have distorted and where the various stitches have moved relative to where they are expected to be based on the fabric design. The color design will typically be overlaid on or referenced to the design stitch data (FIG. 5) so that adjustments can be made to ensure the design is printed in a manner aligned with the actual conditions of the fabric.

To determine the print adjustment 112, the warping of the pattern must first be determined by from comparing actual and design data 110, by matching actual threading data 110 to identified threading 108 using identified markers 109. Thus, the pattern registration 111 can be created. This registration identifies how the actual fabric has warped/distorted relative to the design. This indicates a print adjustment 112 needed which is then applied to the print design 114 for the particular location on the fabric. Here, the print design may be a multiple color design which fills in different areas of the fabric with different colors and is matched to the expected pattern of the fabric. However, the print design is not limited to just color inks, but can include other printable materials, preferably printable liquids, that can be applied by a printer to give various properties such as in technical textiles in certain locations according to the print design. Non-limiting examples include anti-microbial, water repellant, higher friction inks/liquids. Here, the design stitch data (FIG. 5) is matched with the printed design which would include areas within the fabric being filled in with various colors or other inks/printable liquids/materials. Thus, the print design file may be a bitmap file similar to FIG. 5 but with various colors (or other identifying information) filled in in the white spaces. Furthermore, the black bitmap lines of FIG. 5 could have added color too. Although the bitmap of FIG. 5 shows black where the stitches are present, typically the stitches will be done with a thread color that matches the overall fabric. Thus, the black is used to distinguish. The fabric itself will typically come in a white color to avoid print color distortions due to a non-white substrate, however other yarns could be added, for example a metallic thread or a polyester thread which is not printable by a the ink used can be added and that yearn may not adhere or hold the ink and as a result, added visual effects can be created.

The print design will normally be sized to the same scale as the design threading data file and each pixel can therefore be referenced relative to the design threading data and where that pixel should be relative to the various threadings designed into the fabric. Since the pattern registration determines how the design threading data has warped/distorted in the actual fabric, the print file has to be warped/distorted in the same way to match, therefore, this print design being the ideal design assuming the fabric does not stretch is adjusted based on how the fabric stretches and the threadings detected and how they have moved relative to the design threading data file. As a result, adjusted print data is computed which distorts the print design in the same way that the fabric has been distorted so that the various design elements of the print design line up with the distorted fabric in real world conditions. This adjusted print data is then sent to the printer buffer 116. This adjusted print data may represent enough lines for a single stroke of the print head 4 across the fabric if a semi-continuous printer is used or a line by line feed of data if a continuous printer is used. However, the continuous printer could also receive batches/sections with multiple lines and the semi-continuous printer could also receive data line by line and then print once there are enough lines for a stroke. However, since the fabric must pass by the scanner before the adjusted print data can be determined, the batches cannot represent the entire print file as it would not be possible to know the distortion of the entire length of the roll until the roll has been scanned, thus the actual print data sent sequentially to the printer and its buffer represents less than the whole print file length, normally less than half, preferably less than 25% and even more preferably less than 10% and even more preferably less than 5% of the entire print design length in some cases, this is equal or less than the distance between the vision system and the print position as defined by e.g. the print head and/or the nozzle arrays. Since the print head and vision system are spaced apart, the printing 118 may not immediately follow the imaging and the motor may need to move the fabric and image additional sections of fabric before the first imaged section is in the printing position. Once there is proper alignment in that the fabric has moved the first scanned section (which could be a single line) into the correct position to print, the print head or print array will use the adjusted print data to print the fabric. Since the fabric is resting on a relatively tacky/sticky or high friction belt, the fabric cannot move or distort much if at all when moving from vision to print positions. As understood in the continuous printer process, the section of the fabric associated with the adjusted print data may need to move over several feet or meters to pass by the various color nozzles for that section, thus the belt may continuously move the fabric past the scanner and through the print array of the various colors to be applied. However, it is important that the feed roller 160 move with and is synchronized with movement of the motor 80 to avoid backwards tension and the takeup roller 180 also needs to avoid pulling the fabric. Although the fabric 16 is shown straight and under some tension, some preferred embodiments would allow the fabric to be moderately loose between the conveyor rollers and the feed/takeup 160/180 rollers to avoid stretching while the fabric moves. If there is some play/looseness in the fabric in these areas 16'/16", any failure to perfectly synchronize the conveyor 8 and the rollers 160/180 can be absorbed by some looseness in the fabric. However, the fabric should not be too loose in order to avoid getting caught in the conveyor 8. Thus the motors associated with the feed/takeup rollers 160/180 can also be controlled by the computer based on encoder 10/12 data or can be controlled by the printer in order to coordinate with the conveyor. For example, the control signal to the motor of the conveyor may be used by the computer to then determine how fast the rollers 160/180 should move, notably the roll will progressively increase in diameter which if the revolutions per minute of the rollers 160/180 stay the same would result in ever increasing speeds of the fabric coming onto or exiting those rollers 160/180, thus synchronization of the fabric speed is important to avoiding changing how the fabric is distorted between the scan and print stages. If the distortion did change, that could result in poor print alignment.

Figure 6:
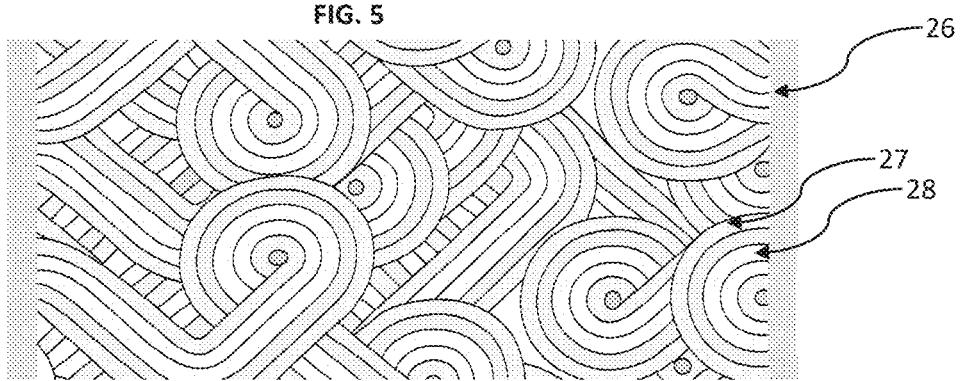
FIG. 6 shows the detection of the fabric as distorted for printing by the apparatus of FIG. 1A-B.

Once the threadings are identified 108, a comparison to actual threading data 110 is done. FIG. 5-6 shows an example where FIG. 5 represents the design for the threading and FIG. 6 represents the actual print data to be printed and also can be seen to depict how actual threading data in the form of a pattern registration 111 has been distorted relative to FIG. 5 in that the black lines shown have moved in different places relative to FIG. 5. In this example of the intended print, the stitches (foreground stitches here) are intended to be printed in black. The actual threading data would be a representation of FIG. 5, but with the stitches moved based on how they are detected to have moved by the vision system. FIGS. 11 and 12 show image data (FIG. 11) which is then converted into actual threading data FIG. 12. FIG. 12 shows a different section of the fabric design compared to FIGS. 5 and 6. As can be seen comparing FIG. 5 to FIG. 6 areas 24 and 26 are not the same. This is one example of a distortion. This distortion is non-linear and other threading are located where expected and others distorted more than the 24/26 examples, thus some areas need adjustment whereas others do not and other areas need more adjustment. Generally, the pattern threadings (foreground stitches here) will modify locally how the fabric stretches and given the varying nature of the pattern, the way in which the fabric stretches/deforms and the resulting distortion of the pattern is difficult to predict. However, once the comparison is done between the design and actual pattern data, the computer then determines how the print design needs to be adjusted. The print design will in many cases include one or more colors that are to be printed on the pattern of the fabric. This design is often done on top of or in reference to the threading design pattern so that surface variations created by the threadings can be printed differently relative to the threading. For example, referring to FIG. 6, the area 27 between the two black lines shown may be red whereas area 28 may be blue and the different colors may follow the path of that area between the two black lines in the intended design. The design may be e.g. consistent with FIG. 5 and the various curves and design elements, but various colors added, typically in ways which follow the threading lines. The threadings (stitches in this example) might also be printed, for example actually printed in black. In the example of areas 27 and 28, these are two concentric circular patterns that may have different colors, but the intended print design will be referenced to the threading design that creates the surface variation pattern of the fabric. It is understood that FIG. 5 may show black dots representing the stitches, but the stiches in practice are often the same color as the base fabric, and thus may be printed as well. Thus, the intended print data or print design will be based on the design threading data (FIG. 5), but with colors added. As one of skill in the art will appreciate, the pattern of the fabric and the print design can vary, depending on what designs are preferred by the designer. The designs used herein are illustrative and exemplary only and not limiting.

Figure 4A:
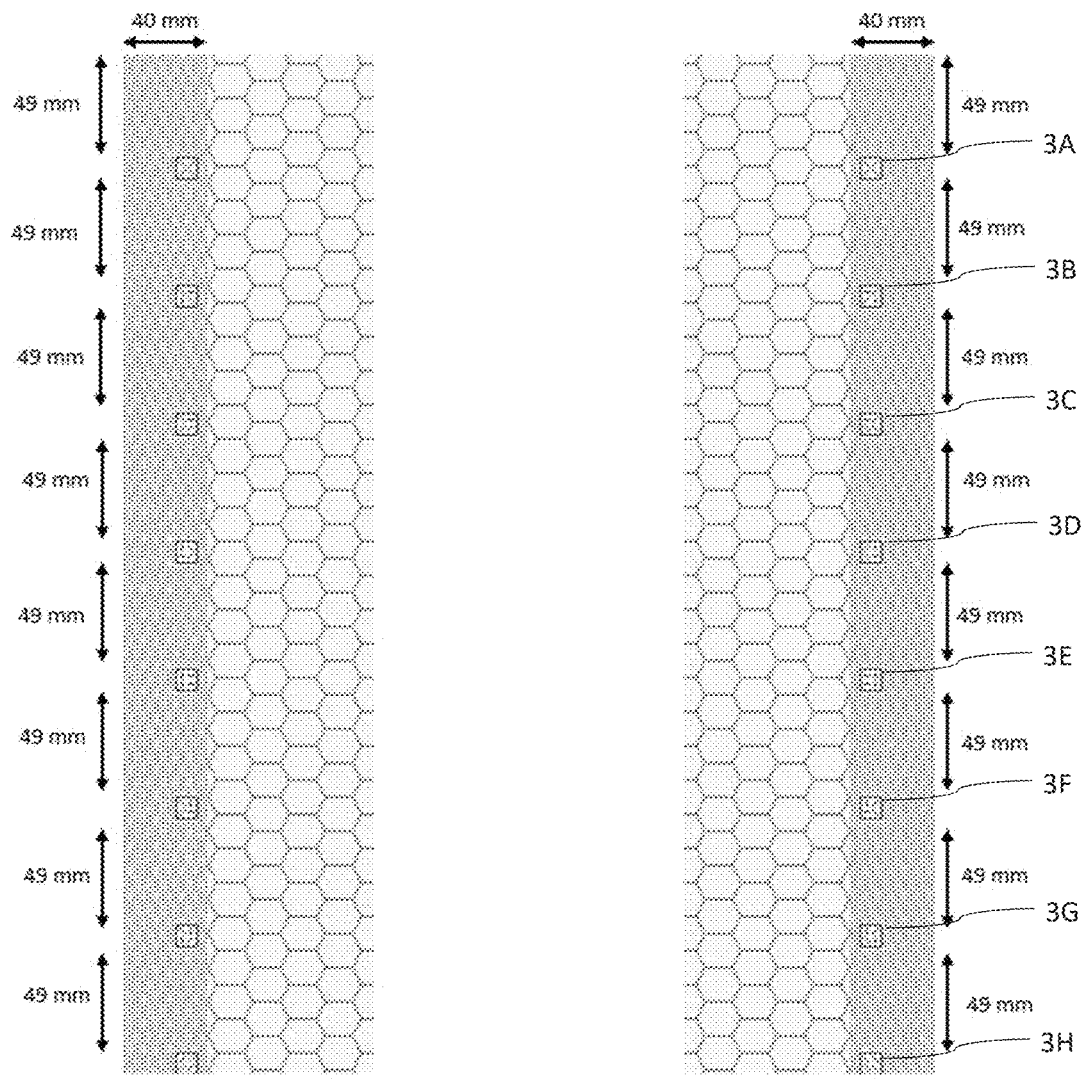
FIG. 4A shows the arrangement of the markers of FIGS. 3A-3H on a selvedge of a fabric to be printed by the apparatus of FIGS. 1A-1B.
Figure 4B:
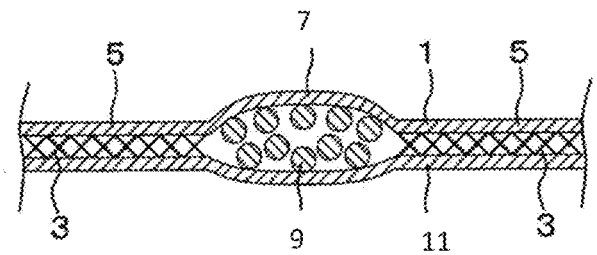
FIG. 4B shows a schematic cross section view of a double jersey knit fabric.

As shown in FIG. 4B, the fabric has loft created by a middle portion which is between exterior portions 11, 5. The variance in loft creates surface variations, for example area 7 is of higher loft than area 1. Stitches 3 cross from the front 5 to rear 11 portions to compress the fabric in these area whereas yarns 9 provide more loft in area 7. If the cross section were taken in a position moved into our out of the page, there could be more loft in the areas shown with many stitches 3. Thus, the cross section is taken through an area largely with the pattern threadings but with a smaller area without that creates loft. The yarns 9 would also be in the area with the stitches 3 but are not shown for clarity. The yarns are but one example of a filler or loft creating material and those skilled in the art would understand other materials could be used. The base knit pattern 7 is shown in FIG. 7 and the stitches 3 in FIG. 4B coincide with the bitmap (FIGS. 5/8). The bitmap and specifically each pixel represents an instruction to the knitting machine, for example, push a needle from bottom through the top and create a loop which pulls the top and bottom together. As a result, yarns 9 are compressed and/or displaced.

To assist in determining where stitches of the design (FIG. 8, 5) and the actual stitches (FIGS. 6, 9) are located, reference markings in the fabric can be provided. FIG. 3A-3I shows example markings. These markings are typically also threadings and are typically in the selvedge of the fabric. Each pixel may represent a stitch or a binding and as can be seen each of 3A-3H has common elements and different elements. These markings are used by the computer to help determine where within the design stitch data the fabric being scanned is located. FIG. 31 is a dimensioned drawing of FIG. 3A. As can be seen, the 1 mm thick by 11 mm wide square surrounds this marker (and all other markers), thus this consistent element can be identified to allow the computer to determine it is looking at a marker. Then, within the perimeter of stitches, there is a 9×9 mm opening with a 1 pixel wide border which does not have stitches. Then, within the border, there are a number of 1×1 mm stitches arranged in various patterns. The data from the vision system 6 is looked at by the computer to determine where these patterns of stitches are found, thus indicating where along the pattern of the fabric the machine is located. This helps further identify where foreground/background stitches are located and helps the computer better know where it is within the fabric (or at least be closer thereto as a starting point). As shown in FIG. 4A, the markers are sewn into the selvedge at regularly spaced intervals, although a pattern which repeats over a small interval is shown, the pattern of FIG. 5 may be shown and it may repeat over the interval between markers 3A-3H. The specific dimensions shown are exemplary only. As mentioned, the fabric pattern shown is exemplary, but may be a more complex pattern than the one shown, for example the pattern in FIGS. 5-6. As shown in FIG. 2, when threadings are identified 108, the selvedge markers 109 may be identified, typically first. This allows for the computer to better start at or close to the correct position within the design threading data in order to more quickly identify the threadings and more quickly align and adjust the print design to match actual conditions of the fabric.

Thus, the computer can know where the markings are relative to the pattern and can know the intended spacing of the markers and which marker follows which. Because the markers include a common element (this case a rectangle), they are easy to identify. The interior of the marker then includes varying threading elements which allow for differentiation between the markers. The specific configuration, size and location of the markers is exemplary only as other marker configurations can be used.

As shown in FIGS. 3A-3H, the reference markings include some matching elements and some non-matching elements. In this example, the stitch size in the fabric is 1 mm, thus each 1 mm×1 mm pixel (see FIG. 31) represents one stitch. Thus, the outer border 300 on the right vertical side represents 11 stitches. This outer 11 mm×11 mm border 300 surrounds an area 302 that is 9 mm×9 mm with no (foreground) stitches. Thus, background stitches would be found in this area. The next inner area of the marking is the area which changes for each marking in some way. This can be seen as a series of codes 304 of stitches (3 stitches in this case) which can be horizontal, vertical, diagonal (down right to left) and diagonal (up right to left). The three stitch pattern can then be varied in the four different zones shown to indicate a different marker pattern.

As shown in FIG. 4A, these markers are spaced along the length of the fabric in the selvedge and are themselves surface variations in the fabric created by the threadings that make up the markers. Thus, the combination of the matching elements (border 300, interior of border 302, see FIG. 31) and the changing code elements 304 (FIG. 31), provide a recognizable marker. Since the marker information and particularly the bitmap representing where the stitches are located is found in the design file for the fabric. Thus, the design location of the various other stitches within the design is known in terms of coordinates relative to the markers. The vision system and computer will first search out the common matching elements (border 300, interior section 302) to determine that a marker is being scanned.

The feed roll 160 includes the fabric 16 which has not been printed. In this case, the fabric is patterned with surface variations made by the threading design. Generally, this roll is several meters wide, for example in the range of 2.5-4 meters wide (e.g. 100 inches wide), but other widths are contemplated. The fabric is generally much longer than it is wide, normally at least 4 times the width. Normally these fabrics come in rolls of around 100-300 feet. The selvedge of the fabric includes the reference markings. It is understood these dimensions are exemplary only.

As shown in FIG. 4A the selvedge is 40 mm wide. This width is larger than commonly found selvedges. The added width is also helpful for imaging and printing the fabric. Specifically, in the processing of the fabric, specifically the knitting/weaving process, the selvedge is added in part because it is somewhere on the fabric that grabbing elements can hold the fabric securely. These grabbing elements are often spiked or a number of needles which puncture or otherwise poke through the fabric. This creates a secure hold for processing/manufacture of the fabric. But, when the printing process includes stitch level detection through imaging, the grabbing elements can create holes in the selvedge which shown up when the vision system scans the fabric prior to printing. These holes can cause false positives on stitches that make identifying the markers more difficult or which create incorrect identifications if the grabbing holes were placed in the area of the selvedge which includes the marker, thus the width of the selvedge has been increased so that the outer portion (about 20 mm) can be used with the grabbing elements during weaving/knitting in a way that does not disturb or poke holes through or near the reference markings 3A-3H or the areas around those markings. As shown in FIG. 3L, each reference marking is 11 mm×11 mm. Thus, in the particular embodiment shown, the selvedge is about 4 times the width of the reference marking. The marking is therefore offset from the design area A (FIG. 5) a small distance (e.g. 4 mm), leaving 25 mm of selvedge for grabbing space during processing/manufacture. Thus, in preferred embodiments, the reference markings are positioned on the inner half of the width of the selvedge, closer to the printed design area A. In other aspects, the selvedge width is at least 2 times the marker width, more preferably at least 2.5 times, even more preferably at least 3 times and most preferably about 4 times the marker width.

The marker spacing along the fabric length is also important to accurate alignment. Here, the marker height is again 11 mm and the spacing between markers is 49 mm, thus every 60 mm there is another marker. This is but one example. The spacing between markers can be adjusted depending on the complexity of the fabric. With the 11 mm height and 49 mm spacing, the height to spacing ratio is about 1:5. Generally, this spacing ratio can be on the lower end 1:2, 1:3, 1:4, 1:5, or 1:6 and on the upper end 1:7, 1:8, 1:9, 1:10 and any combination of these upper and lower limits.

FIG. 5 shows the design of the fabric. Here, the design is a bitmap representing foreground stitches in the fabric with each dark pixel representing a stitch, particularly a foreground stitch. Also included in the bitmap are the reference markings 22 in the selvedge 20. The print design will in many cases include one or more colors that are to be printed on the pattern of the fabric. For example, areas 27 and 28 may include a color or a color design. This color design is often done on top of or in reference to the threading design pattern so that surface variations created by the threadings can be printed differently relative to the threading. For example, the area 27 between the two black lines shown may be red whereas area 28 may be blue and the different colors may follow the path of that area between the two black lines in the intended design. The design may be e.g. consistent with the stitch design and the various curves and design elements, but various colors added, typically in ways which follow the threading lines. The threadings (stitches in this example) might also be printed, for example actually printed in black. In the example of areas 27 and 28, these are two concentric circular patterns that may have different colors, but the intended print design will be referenced to the threading design that creates the surface variation pattern of the fabric. It is understood that FIG. 5 may show black dots representing the stitches, but the stiches in practice are often the same color as the base fabric, and thus may be printed as well. Thus, the intended print data or print design will be based on the design threading data (FIG. 5), but with colors added (e.g. areas 27/28 etc as described above. As one of skill in the art will appreciate, the pattern of the fabric and the print design can vary, depending on what designs are preferred by the designer. The designs used herein are illustrative and exemplary only and not limiting.

FIG. 8 is a zoomed in section of the FIG. 5 bitmap showing a detail view of the stitch bitmap. Here, the background stitches 32 are generally the areas with higher loft whereas the foreground stitches 34 are areas with lower loft.

The reference markings in the design of the threadings (FIG. 5) allows each stitch to be located relative to the reference marking. For example, FIG. 8 shows the foreground stitches 34 are located at a known (design) distance and at known coordinates relative to each of the reference markings. For example, if a scan picks up reference markings 3A and 3B and the coordinates of foreground stitches 34 put them within that scanned area, the detection of stitches 34 is mathematically easier because the starting point of optimization is closer to the actual stitch. While the known (design) distance/coordinates assumes no deformation and the coordinates of the design should be relatively close to the actual location after deformation. The use of markers can be especially helpful in repetitive designs, making the location on the design less ambiguous or difficult to register using the vision and computing system to determine actual tread data and then distort the design accordingly. Further, the stitch design may be repetitive or regular, but the print design may not and may change more in comparison over the length/width of the fabric.

As a result, the fabric provided with the reference markings can be printed accurately and aligned with the patterned design in the fabric more easily and more easily aligned throughout the roll. The result after printing is a patterned fabric that has a pattern based on surface variations in the fabric and then has a printed design printed on top of that pattern, with the print and the pattern more accurately aligned with the actual pattern of the fabric.

The printed design of FIG. 5 includes a threading area (stitches in this case) which is adjacent the stitches in a first color. For example, the threading (stitch) area 29 of FIG. 5 may be black in color or some other design or color after printing and this color follows the stitch area and any patterns/curves it follows along at least a portion of a length of that area thereof (which follows the stitches). One or more areas 27/28 adjacent the stitch area 29 are printed in a color or design different than the stitch area 29. For example, areas 27/28 may be red or may be different colors 27—red, 28—blue or may have any number of designs. The color/design will follow along at least a portion of the length of that area through its curves and/or patterns, following adjacent the stitch area. The color herein may be a gradient or may switch to a variety of colors or may include a pattern within the color (e.g. printed shapes of one color within a background color in one or more of the areas 27/28). In preferred aspects, the printed design and the various areas align with the stitches in that e.g. area 28 is printed without crossing over the actual stitch area 29 in at least more than one location on the fabric.

To additionally help determine and monitor the location of the fabric, the encoder(s) described herein 12/10 are used to verify the speed/position of the belt 8 and to properly control the motor 80. In the semi-continuous printer arrangement, the motor will move in steps or stages which are the width of the print head's print area. In this manner, generally rectangular sections of the fabric are imaged and sequentially adjusted print data for those sections are sent to the buffer. Once one section is imaged, that scan data will be sent to the computer. The scan data may include encoder data so that each scan line is associated with a position on the fabric or the encoder data may be separately sent to the computer and the scan lines associated with the encoder data to determine position. Particularly, as the fabric moves, the vision system may capture the images used to identify threadings. As these images are captured, the encoder data provides a longitudinal reference to where those scan lines are taken from. After the threadings are identified and the print design is warped/distorted to match the fabric, the adjusted print data is sent to the print buffer 116 which may be a storage associated with the printer/print head. It is also contemplated that the computer may send line after line to the print buffer as they are computed and the semi-continuous printer then does a print stroke once there are enough lines and the correct section of fabric is moved under the print head, the adjusted print data is printed on the fabric. The continuous printer can also operate in sections or lines and the belt will be controlled consistent with the speed the printer can print assuming there are enough lines in the buffer for the various colors to be added as the fabric moves through the print array. As an example, in FIG. 1A, the spacing between the vision system 6 and the print system 40 will mean that 3 or 4 sections of fabric are scanned before the first section of fabric is printed.

In some embodiments, the scanning and printing happen at different times, but generally in a sequential manner. This is the semi-continuous printer previously described. Particularly, the scanning happens while the belt and fabric are moving past the vision system with linescan cameras capturing lines of the fabric and using the encoder and the selvedge markings to locate the same. Then, when the belt stops (with the correct part of the fabric under the print head), the print head will move across the fabric and print a section of the fabric based on the print adjustment determined by the computer which is in the print buffer 44. As referenced above, due to the vision and print spacing, typically 3-4 sections will be stored in the print buffer at any given time. Once a section has been printed, that data will be pushed out of the buffer with the new scan data replacing it in the correct order. Again, through use of the encoder(s) 10/12, the print head can be aligned precisely and accurately with the fabric, thus ensuring alignment of the printed design with the pattern of the fabric. The continuous printer can also operate with a dynamic buffer in that the print lines are sequentially sent to the buffer as they are imaged and adjustments computed. Or, sections of print lines are sent in sections, however, in the continuous printer, the belt preferably moves in a constant manner and as the fabric moves past the print array, the nozzles of the various color stages print the fabric.

Most printers print complete files for a given substrate. Specifically, the entire print file is sent to the printer at once and then the printer uses those instructions to print the various colors on the substrate, executing one stroke and then moving the substrate and then executing another stroke. However, this will not work in the case of these types of fabrics as they can stretch and distort in unpredictable ways. As an example, it may be desirable to print 100 ft of fabric in a repeating pattern that repeats every 6 feet. If the 6 foot print design were sent to the printer and printed assuming the printer is aligned at the correct staring point, even after one stroke of the print head (representing usually less than a foot), the pattern could have already warped (compare position 24/26 FIGS. 5/6). When the repeating pattern starts over after 6 feet, the pattern may have stretched a certain amount, thus, thus resulting on the next 6 foot print being at minimum off by the amount the that section started off. As a result, the printer would not be adding color within the intended lines or in accordance with the intended design of the pattern within the fabric and the print quality would look poor. The present system sequentially scans and prints sections of fabric by using a dynamic print buffer. Thus, instead of sending the a file with the 6 foot print design repeated over and over (as one file) to the printer and instructing to print that pattern, the print pattern has been designed and sections of the fabric are scanned and the appropriate portions of the print pattern are then only portions of that print design are sent to the print buffer for printing (after adjusting) and each section is sequentially printed. In this way, although the print design is e.g. for a 100 foot roll of fabric, the printer is not fed that 100 foot long design file, instead, the printer is fed (adjusted) sections of the print design corresponding to the print head stroke width.

Figure 10:
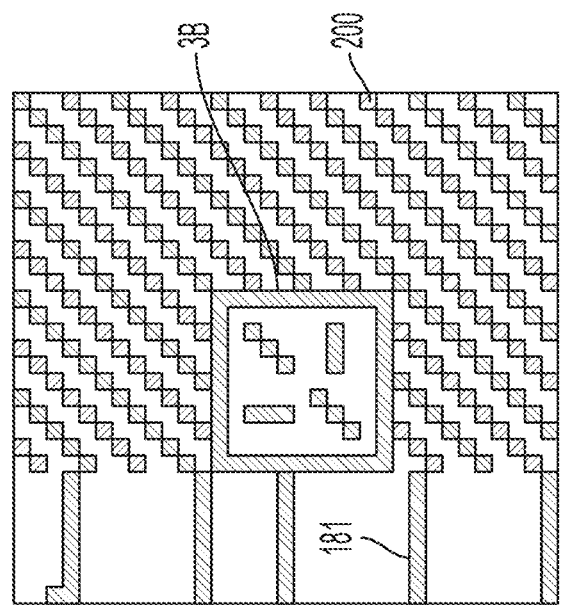
FIG. 10 shows another detail view of FIG. 5.

The registration and matching of the markers is done in the same way as the overall pattern. However, the markers can be an easier starting point to locate as they are all in generally known position (e.g. within a range where the selvedge is or is expected to be) and include consistent elements that are also comparatively easy to distinguish. FIG. 10 shows a portion of the bitmap for the design threading data, again where each pixel represents a stitch. The diagonal pattern of stitches 200 can be considered foreground stitches, and their diagonal patter is known to intersect with a marker. These stitches are part of the selvedge 20. The marker 3B in this case is a series of foreground stitches. As shown, the diagonal stitches 200 do may not extend to the inside of the marker. This may allow for the marker to be more easily identified in that the presence of foreground stitches in the border and then background stitches immediately inside those foreground stitches is a recognizable pattern. Once the marker is identified, stitches 181 adjacent the marker can be more easily located since the position of the marker is known. Thus, the vision system and the computer can determine a distance from the bottom corner of the marker where the first of the stitches 180 is expected to be located and then attempt to look within that general area for the line of stitches.

The process of identifying markers may first involve identifying horizontal and vertical line pairs. Here, the expected spacing between these lines is known (FIG. 31) and thus, identified stitches are located to determine where there are a series of horizontal and vertical stitches. The areas around these stitches are further narrowed down to attempt to identify whether a particular stitch could be a corner and what type of corner it might be (top left, bottom left, top right, bottom right). Based on the spacing of the threadings identified to be possible corners and the number of detected stitches in linear (or relatively so) position between those corners, the marker can be identified. In some cases, it is possible that there can be multiple pairs that could be corners based on where other corners are found. To narrow down the corner markers, the computer includes some known logic regarding the markers, e.g. the top left candidates should be to the left of the top right candidates, top left should be above the bottom left corner candidates and so on. The other logical relationships of the corners of the marker involves first. Once three or four coherent corner candidates are recognized the perfect square marker is transformed into the distorted four sided marker which is actually present. This would still be a four cornered/sided polygon, however the position of the corners may be adjusted based on how the fabric and its selvedge has been distorted. Once the border of the expected square is now known and transformed to the actual shape, the identification of the code within that border can be done. A variety of code examples is shown in FIGS. 3A-H.

FIG. 13 shows an example of how a source pattern (FIG. 5) is converted to the target (FIG. 6). Specifically, the pattern can be broken down into a grid pattern and points on that grid associated with expected stitches can be shifted to match the scanned target according to the following function. In one possible example, quad based registration with bilinear interpolation is used to optimize for the target coordinates of all points.

$$F(x, y) = (1-\delta_x)(1-\delta_y)F_{i,j} + \delta_x(1-\delta_y)F_{i,j+1} + (1-\delta_x)\delta_y F_{i+1,j} + \delta_x\delta_y F_{i+1,j+1}$$

Here, the goal of optimization is represented by the following function where k goes over all points in the source (the pattern, FIG. 5) bitmap where the goal is to minimize the error in corresponding to the target.

$$\min_{F_{i,j}} \sum_{k=1}^{n} D(x_k, y_k)^2$$

The goal function (above) is minimized using non-linear least squares. This is but one example of an optimization method. As another, a set of sample positions can be sparse (far apart) in some cases and stochastic optimization is possible there. Various other optimization methods can be used. In some preferred embodiments, a coarse to fine approach is used. The process starts with a global transform of the area being registered, generally this represents finding the overall amount of shift from end to end and up and down within the area in question, generally a comparatively large area of the fabric relative to the end result of threading level identification. Often, this larger area is identified/selected first base on identified selvedge markings so that all threading can be assumed to be relatively close to their expected location in comparison to if a random location on the design threading file were selected. Next, four corners are optimized, this is 4 points and 8 parameters. Next this area is sub-divided and optimized in a 2×2 grid (9 points, 18 parameters) next a 4×4 grid (25 points, 50 parameters) and so on 8×8, 16×16 etc. until sufficiently granular identification of the threadings and an understanding of fabric warping has been made. By "larger area" this does not necessarily mean the width or even half the width of the fabric (although this is possible in some cases), but the threadings can be stitches in in the 1 mm×1 mm size range and may be relatively close together, thus the relatively large area may still be small compared to the overall width and length of the fabric. A tracing approach can also be used. This involves starting from the markers and identifying stitches moving from the marker inwards and then from those stitches, identifying the next stitches along a pattern line of stitches. Particularly the stitches closest to the marker are likely to have moved less than stitches in the middle of the fabric and the position is more predictable relative to the known position of the marker, once the first stitch inwards of the marker is identified, the next stitch is going to be in a relatively small predictable area. The process can continue for the rest of the stitches.

This process is assisted significantly by the markers. For example, the portion of the pattern (FIG. 5) shown has a number of features which are similar when optimizing in that if the starting point on the design is the wrong one, a local minimum can occur. Thus, mathematically, the computer may believe it has located a threading or a number of threadings based on the goal function being minimized, but this could be due to a local minimum that causes the goal function to be minimized and thus register a false positive for a threading. One way in which this is avoided is by starting with the tracing methodology over a localized area and progressively optimizing to get more granular identification and better matching and the progressively expanding across the fabric. If an acceptable location/area is chosen as the starting point, as the grid becomes more and more granular, more and more threadings should be identified at a high confidence level. However, this also would require starting point within the design threading data to be appropriately selected. If there is a local minimum problem, at some point in the shift from 4×4 towards 16×16 or more granular, the optimization may begin to diverge or confidence in matching threading in the scan to the design may become worse. This can indicate the wrong starting point. However, the selvedge markers help and identify a better starting point for the global transform of the area and better ensure that local minimums are avoided. Particularly, if one marker code is identified on the fabric, the general area surrounding and adjacent that marker can be selected as the global transform area which is progressively made into the more granular grid, each time providing a better and better identification of the threadings. Otherwise, if the markers were not provided, the starting point within the design threading data could be only a guess. Alternately, it is possible that a starting point could be manually aligned. As another alternative without markers, multiple different starting points may need to be selected and optimization attempted for each which could significantly slow down processing times and thus slow down printing. The markers provide an easier to identify set of threadings and based on the design threading data, each threading (e.g. each stitch) has known expected coordinates relative to each marker. With these expected coordinates, the computations focus on determine the warping rather than computing many different iterations to determine a good starting point to then optimize and determine the warping/distortion of the fabric. The problem of local minima may also be decreased/avoided.

As shown in FIG. 4A, the markers are spaced at known and expected distances. In some cases, the spacing is close enough together that when a first section of fabric is scanned and a marker is detected, that section of fabric will not be printed before the next marker is scanned and identified. This can be due to the print head width along with the amount of spacing between the print head and the vision system. Thus, if a marker was incorrectly identified and the next marker is identified as in a manner that is not the next expected marker based on the known fabric threading data, the system may not print that first section and instead re-scan and determine possible errors.

Due to the width of the fabric, the vision system will often include multiple cameras that include overlapping fields of view. FIG. 11 shows an example of two images taken by two different cameras located next to each other. As can be seen area 36 includes threadings that are found in both images. Therefore, to get a complete picture of the fabric without extraneous data, those duplicate threadings need to be merged as shown in area 36' in FIG. 12. This also helps align and reference the images as there are a number of threadings found in both images that can be placed in an overlapping arrangement in the overall image and therefore used to align. Then the duplicate threadings are removed from the actual threading data which is then used for making print adjustments.

Figure 14:
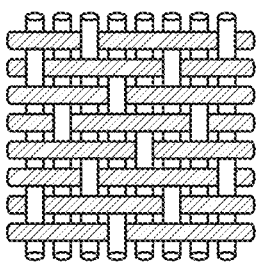
FIG. 14-16 show example bindings for woven fabrics.
Figure 15:
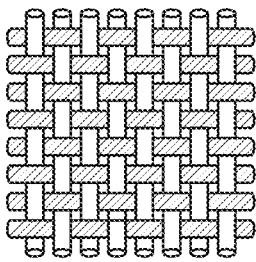
Figure 16:
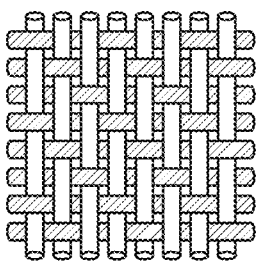
Figure 17:
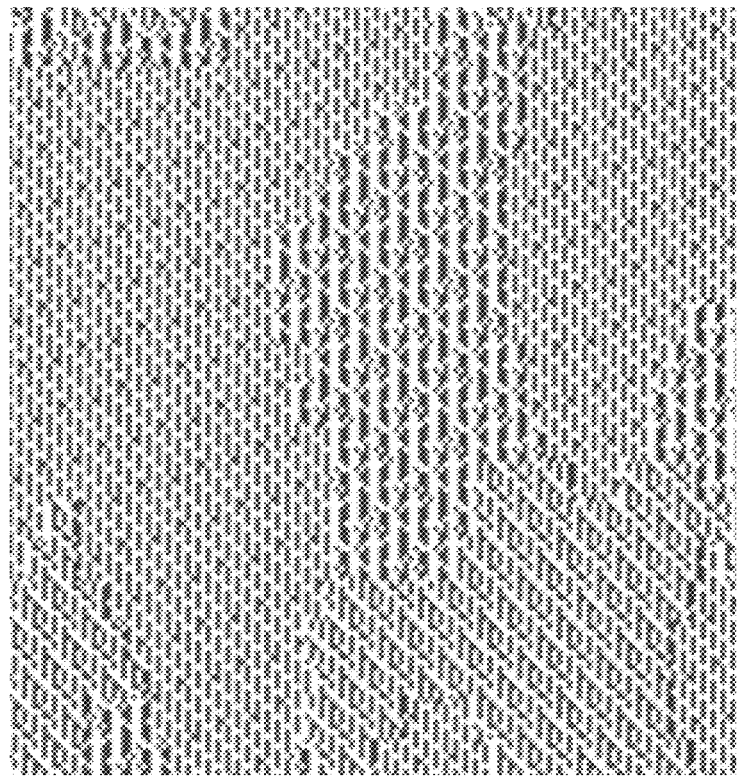
FIG. 17 shows example design threading data for woven fabrics which can be printed by the apparatus of FIGS. 1A-B.

While the previous threading examples have been focused on stitches generally found in double jersey knit fabrics, the threading identification applies to other fabric types as well. Another example of threadings are bindings found in woven fabrics. FIGS. 14-16 show examples of different types of bindings that can be found in woven fabrics. These are not an exhaustive identification of binding types that would be known to those skilled in the art. In these examples of bindings, there are warp threads (up/down) and weft threads (left/right). In this example, either the warp thread is on top or the weft thread is on top at a particular location. Multiple threads may be skipped in a binding pattern. As a result, the vision system will capture e.g. that between two weft threads on top, the vertical thread passes over 4 weft threads (FIG. 14) or that the relationship is 1×1 (FIG. 15) or that two vertical threads are skipped by a weft thread and then one vertical thread is on top and this repeats, e.g. in a 2×1 pattern (FIG. 16). Thus, the threading identification determines which threads are over/under and how many of the others are skipped. A variety of patterns and thread skipping can be done and woven fabrics can be made wherein the binding pattern changes throughout the fabric so that the surface texture changes to therefore cause surface variations. An example of design threading data for a section of woven fabric is shown in FIG. 17. This is typically a bitmap file where the width of each dot in the file represents how the vertical/weft threads are arranged and how many are skipped vertically/horizontally. The woven fabric would also be provided with the selvedge markings previously described and in this case, the foreground/background detection described above would be an indication whether the warp or weft thread is on top. This information is then used to determine how the fabric has warped/distorted to then allow for print adjustments to be made. The selvedge marking in this case may be coded/arranged in a manner more convenient for the binding method of fabric manufacture in that the markers are threadings or changes thereto within the fabric itself.

Calibration of the imaging/vision system 6 relative to the printer 40 also helps further ensure accurate alignment of the print design relative to the fabric pattern. The vision system 6 in a preferred embodiment includes a series of imaging devices arranged on a gantry over the conveyor across a width of the conveyor. Each imaging device (e.g. camera) captures a defined field of view of the fabric and those fields often overlap as shown and described in FIGS. 11 and 12. Since the fabric is relatively wide, there may be several cameras across the width of the fabric. It is possible that each of these cameras is positioned slightly differently than the others and it is possible that the cameras are also positioned relative to the print head or print array in a different way relative to others or that the vision system as a whole is not perfectly aligned as expected with the printer.

Figure 18B:
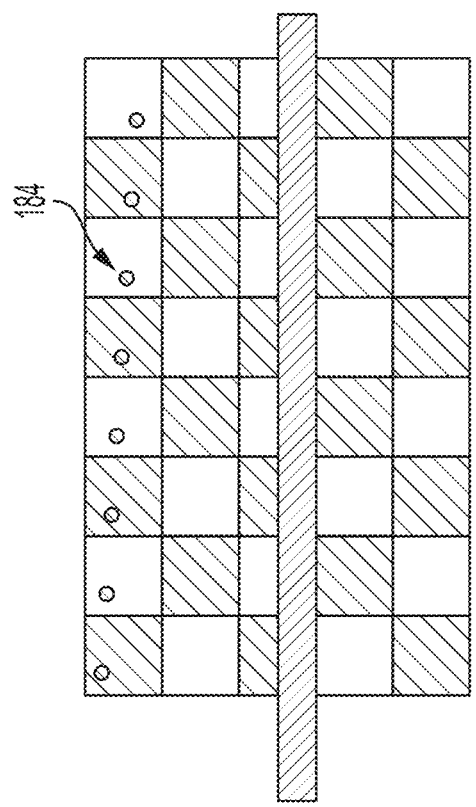
FIGS. 18A-D show a calibration substrate which may be used to calibrate the apparatus of FIGS. 1A-B
Figure 18A:
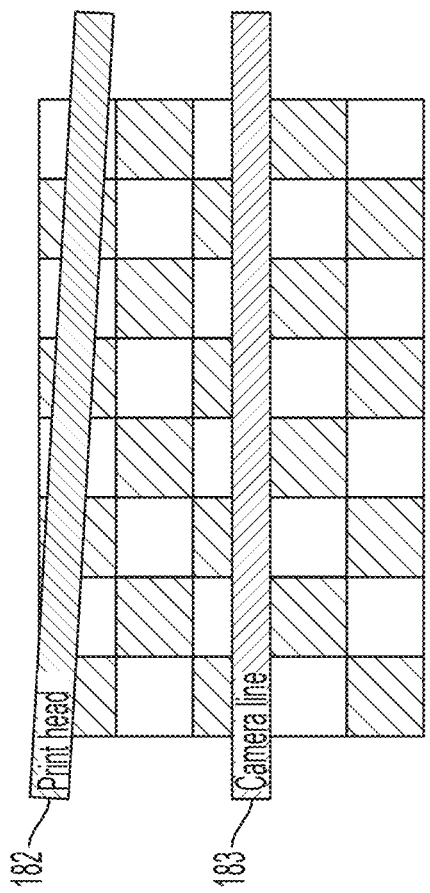
Figure 18D:
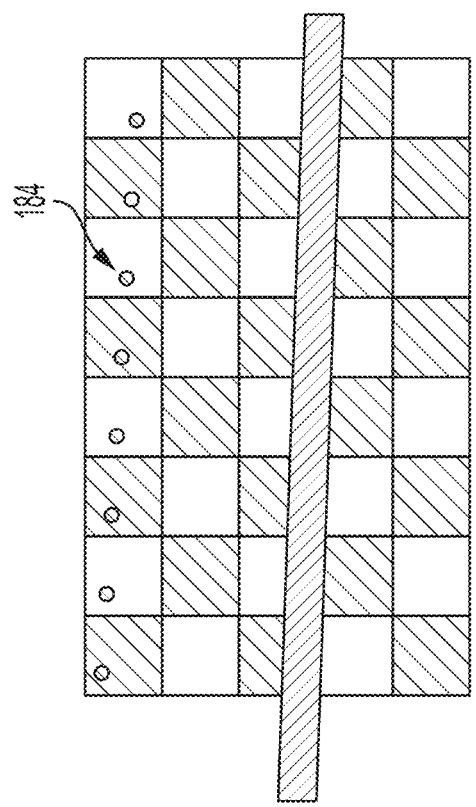
Figure 18C:
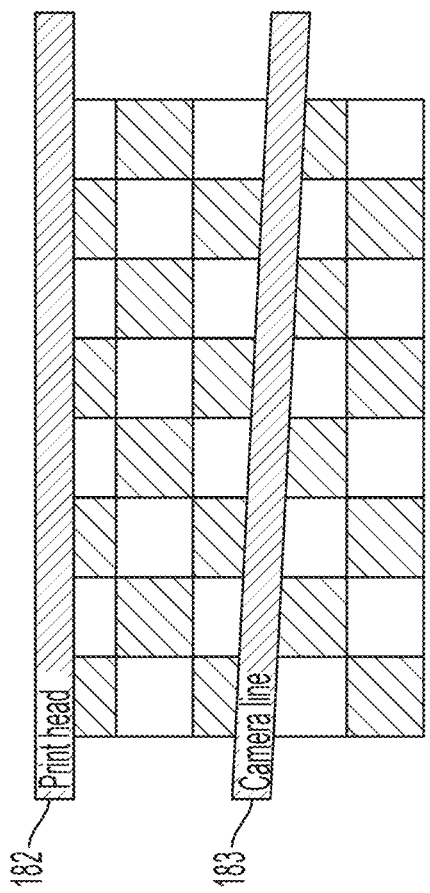

FIG. 18A shows an example checkerboard pattern for a calibration substrate. Each square is of a known size and position relative to the others. The substrate is placed on the conveyor and imaged by the cameras along the camera line 183. In this case, the checkerboard pattern is shown generally square to the camera line 183, however, the calibration process would also work if the substrate were placed at an angle. As the substrate is scanned, the pattern (checkerboard in this case) is identified. The print file for calibration may be to place a series of dots straight across the first set of squares in the checkerboard pattern. These dots may be of a predetermined size and are of contrasting colors preferably as compared to the printed pattern on the substrate. FIG. 18B shows the actual pattern 184 printed by the print head 182 which in this case is at an angle relative to the camera line. This printed pattern is brought back through the camera line 180 for scanning. Therefore, the calibration can be determined by comparing the pattern that the printer/computer was trying to print and the intended (expected) location of the dots relative to the actual location of those dots 184. It is understood that the patterns referenced are exemplary only and other patterns can be used. FIG. 18C is similar to FIG. 18A, but showing the camera line skewed relative to a square print line (relative to the pattern board). FIG. 18D is similarly showing a skewed camera line. It is understood that the calibration may address one or both problems or that the board may be placed on the belt in a way that is not necessarily square, in any event, the calibration process allows for adjustments to be made if the print head/print line is not square/aligned and/or if the vision system is not square/aligned.

Once the comparison between actual and expected locations is made, an offset on the longitudinal and width wise axis can be determined as can an angle of offset these offsets can be considered a calibration. These calibration factors are then applied to the printer and any adjusted print data to ensure that the printed matter is applied in the correct location. Furthermore, if one or more of the cameras are not perfectly positioned on the camera line (e.g. angle, longitudinal, width wise), the scanning of the calibration board can determine this. Particularly, although the cameras are preferably well aligned when setting up, if the cameras overlap in fields of vision as shown in FIGS. 11-12, features common to the substrate pattern can be identified on each camera and then a relative angle/offset of adjacent cameras can be determined. In this case, the checkerboard pattern should result in straight lines being picked up by the adjacent cameras which also align/intersect. If these features of the checkerboard pattern do not line up as expected, it can be determined what amount of calibration should be applied to the vision system and where and further determined what calibration needs to be applied to the printer as a result of the scanning of the second printed pattern (added dots in this example) and the comparison to what was expected.

Figure 19:
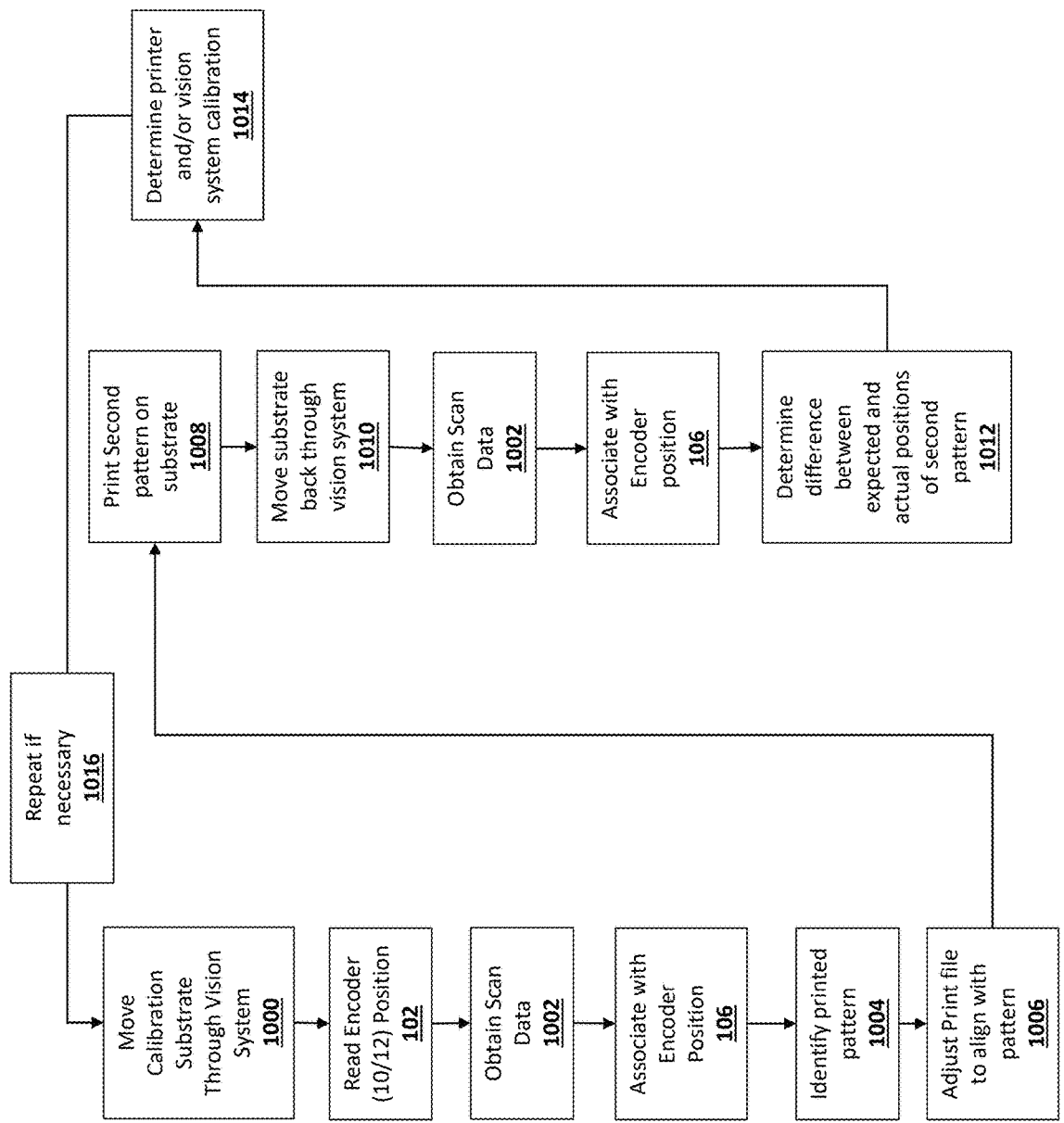
FIG. 19 shows a process flow diagram of a calibration method for the apparatus of FIGS. 1A-B.

FIG. 19 shows the calibration process where the substrate is placed on the belt 8 and moved through the vision system 1000. The encoder is read 102 much like in the printing process and scan data obtained 1002. The encoder position is associated with the scan data 106 and the printed pattern of the substrate is identified 1004 (checkerboard in this example). If the substrate was not placed on straight, the print file may be adjusted 1006 to line up in the way intended with the pattern, but it is also possible that no adjustment is made as the image of the pattern is already known, so the expected position relative to that pattern based on the print file can be determined. Either way, the second pattern is printed on the substrate 1008 (dot example in FIG. 18B) and the substrate is then moved back through the vision system 1010, scan data is obtained 1002 and encoder position is read to associate the encoder position 106 with the scan data. In this case, the encoder is moving backwards relative to the normal printing process. Then it is determined if there is a difference 1012 between the expected and actual positions of the second pattern relative to the first pattern known to be on the substrate. Then, a calibration is determined for the printer and/or vision system 1014. This calibration may be a length and widthwise adjustment of the printer and may include an angle adjustment as but one example. The vision system may also be calibrated if it is determined that adjacent cameras did not align correctly as described previously. The process may repeat 1016 if necessary, in this case a new substrate may be used or the known/existing pattern may be the one that was just scanned and the second pattern would add additional markers. This may be useful when there are multiple different colors to calibrate and it is possible that many nozzles may need calibration. Thus, the process may repeat as necessary to calibrate all print functions. The repetition may be more prevalent in continuous printing machines which have arrays of print nozzles along the length of the machine for printing the various colors, but the repetition and calibration can be useful for any of the print machines useful in printing the materials described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of printing a patterned fabric comprising:
    imaging a section of patterned fabric with at least one imaging device to generate actual thread data indicative of a plurality of threadings which are a plurality of stiches in the fabric which stitches create low points in the fabric to create surface variations and/or are woven bindings which create the surface variations wherein the surface variations cause the fabric to have a three-dimensional pattern;
    comparing the actual thread data to design thread data indicative of expected locations of each of the plurality of stitches and/or woven bindings, the comparing determining a print adjustment which accounts for distortion of the actual thread data relative to the design thread data;
    adjusting print data indicative of a printed design to be printed on the pattern relative to design thread data for the section of the fabric, the adjusting utilizing the print adjustment to determine actual print data which adjusts the printed design to match the actual thread data;
    printing the fabric using the actual print data;
    moving the fabric to a next section of the fabric and repeating the imaging, comparing, adjusting and printing steps for the next section and each subsequent next section until the fabric is printed.

2. The method of claim 1 wherein the adjusting step for one of the next sections compares to a prior section of fabric such that the actual print data of the next section aligns with the prior section which is adjacent that next section.

3. The method of claim 1 wherein the imaging step further comprises imaging an area of the fabric which is expected to include location markings, the location markings indicative of a position on the fabric relative to the three dimensional pattern.

4. The method of claim 3 wherein when an expected location marking is detected, the comparing step's comparison of actual stitch data and design stitch data further uses the marking to calibrate to a location within the design stitch data which is imaged.

5. The method of claim 4 wherein the location markings are a plurality of stitches.

6. The method of claim 4 wherein the location markings are a plurality of stitches in a selvedge of the fabric.

7. The method of claim 1 wherein the at least one imaging device is at an imaging location and a movement device moves the section from the imaging location to a print location associated with a print unit for printing.

8. The method of claim 7 wherein more than one section of fabric is imaged prior to the section of fabric being printed.

9. The method of claim 7 wherein the movement device comprises a belt and an encoder measures movement of the fabric between the imaging location and the print location.

10. The method of claim 1 wherein the threadings are stitches and when printing the fabric with the actual print data one or more of the stitches are printed in a first color that is different from a second color printed on an area adjacent the stitches, with the area adjacent the stitches having a higher loft than at the stitches.

11. A printing apparatus comprising:
    a feed unit configured to move a patterned fabric in a feed direction;
    an imaging unit configured to image the fabric to detect a plurality of threadings in the fabric to generate actual threading data, the threadings create surface variations in the fabric which cause the fabric to include a three-dimensional pattern;
    a processor configured to compare the actual threading data to design threading data indicative of expected locations of each of the plurality of threadings, the comparing determining a print adjustment which accounts for distortion of the actual threading data relative to the design threading data, the processor further configured to adjust print data indicative of a printed design to be printed on the three dimensional pattern relative to the design threading data, the adjusting utilizing the print adjustment to determine actual print data which adjusts the printed design to match the actual threading data;
    a print unit arranged downstream of the imaging unit along the feed direction and the print unit configured to print the fabric using the actual print data.

12. The apparatus of claim 11 wherein the imaging unit is further configured to image a plurality of markers in the fabric, wherein the processor references at least one of the plurality of markers relative to the design stitch data to determine a location in the design stich data which is being imaged.

13. The apparatus of claim 11 wherein the feed unit moves a next section of the fabric to the print unit for printing and wherein the actual print data of the next section is adjusted to align with the actual print data of a previous section of the fabric.

14. The apparatus of claim 11 further comprising an encoder which measures movement of the fabric by the feed unit and provides a signal to the processor.

15. The apparatus of claim 14 wherein the fabric is imaged while the feed unit is moving the fabric past the imaging unit and the signal from the encoder is used to determine a lengthwise position for the actual threading data which is thereby used to align the fabric with the print unit.

16. The apparatus of claim 11 wherein the feed unit comprises an endless belt with a tacky or high friction surface which inhibits sliding and/or stretching of the fabric between the imaging unit and the print unit.

17. The apparatus of claim 11 wherein the plurality of threadings are a plurality of stitches in the fabric.

18. The apparatus of claim 11 wherein the plurality of threading are a plurality of woven bindings in the fabric.

19. A fabric printer which utilizes a dynamic print buffer comprising:
- an imaging unit configured to image the fabric to detect a plurality of threadings in a plurality of sections of the fabric to generate actual threading data, the threadings create surface variations which thereby cause the fabric to be patterned;
- a processor configured to compare the actual threading data to design threading data for each section of the fabric, the design stitch data indicative of expected locations of each of the plurality of threadings, the comparing determining a print adjustment which accounts for distortion of the actual threading data relative to the design threading data, the processor further configured to adjust print data indicative of a printed design to be printed on the pattern of the fabric relative to design threading data wherein the print data represents the printed design for a plurality of sections of the fabric, the adjusting utilizing the print adjustment to determine actual print data for each section of fabric which adjusts the printed design to match the actual threading data for each section of fabric;
- a print unit arranged downstream of the imaging unit along a feed direction and the print unit including a print buffer which is configured to sequentially receive the actual print data for each section of the fabric and use that actual print data for each section of fabric to instruct a print head to print the fabric;
- a feed unit which is configured to move the fabric such that each section of fabric is imaged with the imaging unit to generate the actual print data for each section of fabric and the feed unit then sequentially aligns each section of fabric with the print unit and the actual print data is fed to the print buffer sequentially to print the corresponding section of the fabric.

20. The apparatus of claim 19 wherein the plurality of threadings are a plurality of stitches in the fabric.

21. The apparatus of claim 19 wherein the plurality of threadings are a plurality of woven bindings in the fabric.

* * * * *